US012615652B2

(12) United States Patent
Dhanani et al.

(10) Patent No.: US 12,615,652 B2
(45) Date of Patent: Apr. 28, 2026

(54) SYSTEMS, METHODS, AND DEVICES FOR INTELLIGENT RADIO RESOURCE SELECTION FOR V2X NR PC5

(71) Applicant: Apple Inc., Cupertino, CA (US)

(72) Inventors: Tarakkumar G Dhanani, San Jose, CA (US); Sanjeevi Balasubramanian, San Jose, CA (US); Sharad Garg, Cupertino, CA (US); Vijay Venkataraman, San Jose, CA (US); Rohit Thareja, Redwood City, CA (US); Vijay Gadde, San Jose, CA (US)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 18/330,662

(22) Filed: Jun. 7, 2023

(65) Prior Publication Data

US 2023/0413302 A1 Dec. 21, 2023

Related U.S. Application Data

(60) Provisional application No. 63/353,969, filed on Jun. 21, 2022.

(51) Int. Cl.
| | |
|---|---|
| *H04W 72/51* | (2023.01) |
| *H04W 64/00* | (2009.01) |
| *H04W 72/04* | (2023.01) |
| *H04W 72/40* | (2023.01) |

(52) U.S. Cl.
CPC ......... *H04W 72/51* (2023.01); *H04W 64/006* (2013.01); *H04W 72/04* (2013.01); *H04W 72/40* (2023.01)

(58) Field of Classification Search
CPC ... H04W 72/51; H04W 72/40; H04W 64/006; H04W 72/04; H01Q 1/273; H01Q 1/364; H01Q 7/00; H01Q 9/0414; G01S 19/19; G01S 19/48
See application file for complete search history.

(56) References Cited

U.S. PATENT DOCUMENTS

| | | | |
|---|---|---|---|
| 2010/0240389 A1* | 9/2010 | Harper | H04W 36/385 |
| | | | 455/456.1 |
| 2022/0291393 A1* | 9/2022 | Gum | H01Q 7/00 |
| 2023/0035711 A1* | 2/2023 | Zheng | G01S 5/011 |
| 2023/0184870 A1* | 6/2023 | Shuman | G01S 5/0036 |
| | | | 455/456.1 |

* cited by examiner

*Primary Examiner* — Rushil P. Sampat
(74) *Attorney, Agent, or Firm* — Eschweiler & Potashnik, LLC; Ningjiao Zhang

(57) ABSTRACT

Techniques, described herein, may enable a vehicle to engage in vehicle-to-everything (V2X) communications via PC5 sidelink (SL), even when the vehicle does not have a global positioning system (GPS) or other type of satellite signal. While receiving a satellite signal, the vehicle may pre-store future geographic locations based on a travel route and upon detecting a loss of the satellite signal, the vehicle may estimate a geographic location of the UE based on one or more types of information, such as mapping or navigation capabilities of the UE, a travel time since the signal failure or last estimated geographic location, a travel velocity since the signal failure or last estimated geographic location, etc. The vehicle may determine, based on an estimated geographic location, that physical resources are appropriate for SL communication and begin using the physical resources accordingly.

20 Claims, 12 Drawing Sheets

SYSTEMS, METHODS, AND DEVICES FOR INTELLIGENT RADIO RESOURCE SELECTION FOR V2X NR PC5

REFERENCE TO RELATED APPLICATIONS

This Application claims the benefit of U.S. Provisional Application No. 63/353,969, filed on Jun. 21, 2022, the contents of which are hereby incorporated by reference in their entirety.

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology may include solutions for enabling user equipment (UE) to communicate with one another.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
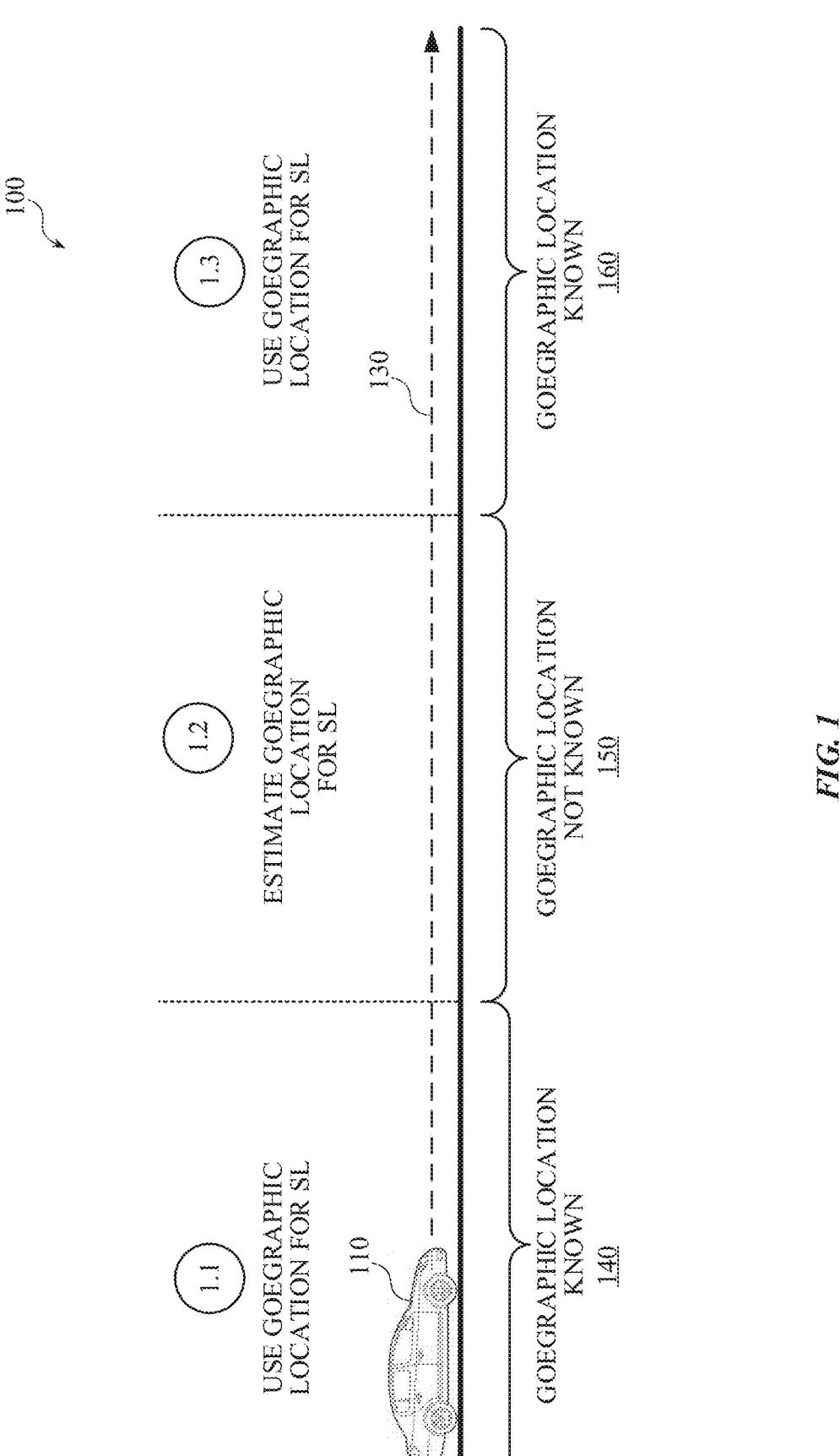
FIG. 1 is a diagram of an example overview according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless networks may include user equipment (UEsF) capable of communicating with base stations, wireless routers, satellites, and other network nodes. Such devices may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Internet-of-Things (IoT) devices (or IoT UEs) may utilize one or more types of communication technologies, such as proximity-based service (ProSe) or device-to-device (D2D) communications, vehicle-to-anything (V2X) communications, sidelink (SL) communications, and more.

V2X communications, as described herein, may include a scenario in which a vehicle operates as a UE to discover, establish a connection, and communicate, with one or more of a variety of wireless devices via SL (e.g., a D2D communication). Examples of such devices may include a smartphone, a V2X-capable vehicle, and/or another type of UE or IoT device. V2X communications may also include so-called vehicle-to-vehicle (V2V) communications, vehicle-to-infrastructure (V2I) communications, etc. A UE, as described herein, may refer to a smartphone, tablet device, wearable wireless device, a vehicle capable of V2X communications, a portion of a vehicle capable V2X communications, and/or another type of wireless-capable device. As such, references herein to a "vehicle" and features enabling V2X communications may be applied to the broader categories of UEs in general and D2D or SL communications in general.

The direct communication between vehicle and another device (e.g., a V2X communication) may involve a so-called PC5 interface. PC5 may refer to a reference point where a vehicle directly communicates with another device (e.g., smartphone, vehicle, etc.) over a direct channel. In such a scenario, communication with a base station may not be required. At a system architectural level, ProSe may be a feature that specifies the architecture of the direct V2X communication. In 3GPP RAN specifications, the term sidelink or SL may refer to the direct communication over PC5. In short, the PC5 interface may enable vehicles and other devices to use communication standards (e.g., 4G, 5G, 6G, etc.) to establish direct (or SL) connections with one another without the traditional network infrastructure (e.g., base station, core networks, etc.). However, currently available V2X via PC5 technologies include certain limitations.

For example, physical wireless resources available for V2X via PC5 may change depending on a location of the vehicle. One country or region may designate a certain range of radio frequencies (RFs), transmission (Tx) powers, etc., for V2X while another country or region may designate another range of RFs, Tx powers, etc., for V2X. As another example, areas within the same country may use different physical wireless resources for V2X (e.g., public areas versus airports, military areas, scientific research areas, etc.). As such, a vehicle may be required to know a current geographic location of the vehicle/UE in order to select appropriate physical resources to communicate via the PC5 interface based on resource configurations and establish V2X communications. Otherwise, the vehicle/UE is likely to use incorrect physical resources and thereby fail to establish V2X communications.

Currently available technologies (e.g., Global Navigation Satellite System (GNSS) or Global Positioning System (GPS)) may enable a vehicle/UE to determine a current geographic location of the vehicle in some scenarios, such as when the device is connected to an appropriate access network (e.g., a wireless router, base station or satellite). However, currently available technologies fail to provide solutions for enabling a UE to determine a current geographic location of the UE when the UE is outside of the coverage of such network devices. By extension, therefore, currently available technologies also fail to enable UEs, outside of network coverage, to establish V2X communications via PC5 since determining the appropriate physical resources to use are based on the current geographic location of the UE.

Techniques, described herein, may be used to enable a UE (which may include a vehicle) to engage in V2X communications via PC5 even when the UE is unable to determine a current geographic location using currently available positioning technologies like GNSS or GPS. For example, the UE may periodically record a geographic location of the UE. Depending on the implementations, the UE may record the periodic geographic locations of the UE on an ongoing basis after a travel route input by a user (e.g., regardless of network signal strength); or may start recording the periodic geographic locations of the UE in response to the signal strength dropping below a pre-determined threshold.

Upon detecting a network signal failure (e.g., such that the UE is no longer able to determine the current geographic location based on the GPS/GNSS signal) the UE may periodically estimate geographic locations of the UE based on one or more types of information. Examples of such information may include a route previously determined by mapping or navigation capabilities of the UE, a travel time since the signal failure or last estimated geographic location, a travel velocity since the signal failure or last estimated geographic location, etc. Additionally, the UE may determine, based on each estimated geographic location, the radio resources that are appropriate, and may use the radio resources to establish V2X communications via a PC5 interface.

Additionally, when the UE determines, based on a newly estimated geographic location, that new physical resources are now appropriate, UE may switch to the new physical resources to establish V2X communications via the PC5 interface. If/when the UE re-establishes a connection with the network (e.g., a wireless router, a base station, and/or a satellite) the UE may revert to determining the current location of the UE based on geographic information from the network. Accordingly, techniques described herein may be used to enable UEs (e.g., vehicles) to establish V2X communications via a PC5 interface by enabling UEs to estimate a current geographic location of the UE and in turn determine the physical resources that would be appropriate for that location.

FIG. 1 is a diagram of an example overview 100 according to one or more implementations described herein. As shown, overview 100 may include vehicle 110 traveling along trajectory 130. Vehicle 110 is capable of SL communication using radio resources depending on its geographical location. Radio resources, as described herein, may include physical radio resources, such as bands, frequencies, carriers, etc., as well as other transmission parameters, such as transmission powers, QoS parameters, communication mode, and so on. As described herein, vehicle 110 may include internal processing capabilities, user interfaces, and wireless network capabilities similar to that of a UE, and may therefore be referred to as a UE.

As shown, vehicle 110 may initially be in a coverage area 140 of a network device such as a set of satellites, where vehicle 110 is able to determine its geographic location by communicating with the same set of satellites (at 1.1). Determining the geographic location of vehicle 110 may enable vehicle 110 to ascertain that vehicle 110 is in a certain geographical zone or region and therefore determine appropriate radio resources for SL communications (e.g., V2X communications). By contrast, vehicle 110 may enter an area 150 where vehicle is unable to determine its geographic location for lack of network coverage (e.g., not connected to a network device such as satellites, wireless routers, or base stations). The lack of coverage may be caused by a number of factors, such as the location of vehicle 110, the time of day, and the weather conditions. For example, urban environments and mountainous terrain can greatly reduce the number of "visible" satellites which can reduce the accuracy and even loss GPS/GNSS coverage. In such a scenario, as disclosed herein, vehicle 110 may be configured to estimate a geographic location of vehicle 110 based on one or more types of information, such as a last known geographic location of vehicle 110, an initial navigation trajectory and destination input into vehicle 110, a travel time and travel velocity of vehicle 110, etc. (at 1.2). Vehicle 110 may use the estimated geographic location to determine that vehicle 110 is still located in a previous zone/region and therefore is to use the same radio resources for SL communications or located in a new zone/region and therefore is to use radio resources based on SL resource configuration for the new zone/region.

In time, vehicle 110 may enter another coverage area 160 and transition from estimating the geographic location of vehicle 110 to determining the actual geographic location of vehicle 110 (at 1.3, e.g., based on global positioning system (GPS), global navigation satellite system (GNSS), etc., information). The GPS/GNSS coverage of the coverage area 160 may be provided by the same network device such as the same set of satellites or a different network device. As such, one or more of the techniques, described herein, may provide a solution for a vehicle (e.g., a UE) to determine which radio resources are to be used for SL communications even when the geographic location of the vehicle is not known (e.g., when a GPS/GNSS signal is lost). Additional features and techniques are described below with reference to the Figures below and should be incorporated with the disclosure above as fit.

Figure 2:
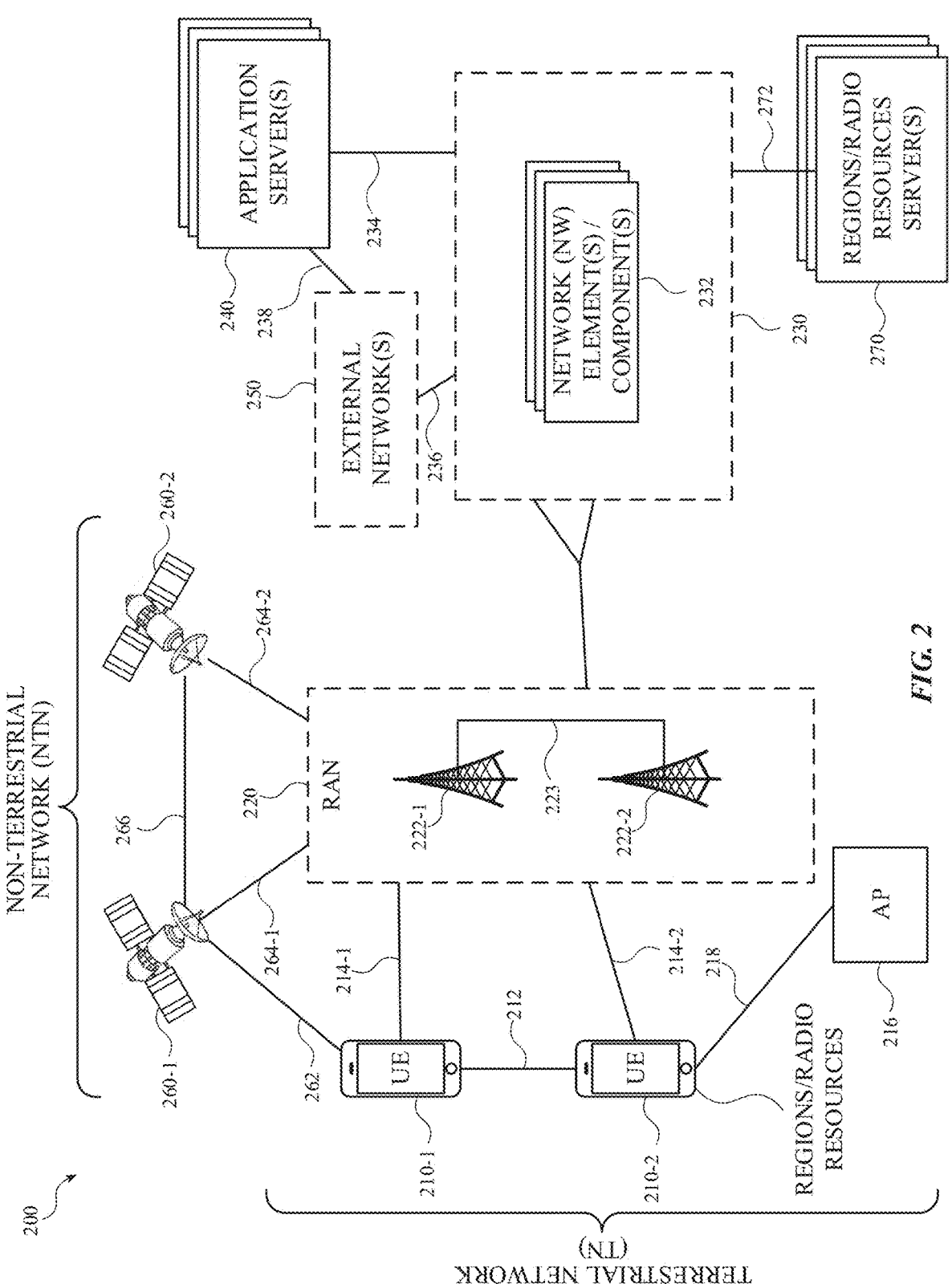
FIG. 2 is a diagram of an example network according to one or more implementations described herein.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, external networks 250, and satellites 260-1, 260-2, etc. (referred to collectively as "satellites 260" and individually as "satellite 260"). As shown, network 200 may include a non-terrestrial network (NTN) comprising one or more satellites 260 (e.g., of a global navigation satellite system (GNSS)) in communication with UEs 210 and RAN 220.

The systems and devices of example network 200 may operate in accordance with one or more communication standards, such as 2nd generation (2G), 3rd generation (3G), 4th generation (4G) (e.g., long-term evolution (LTE)), and/ or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via interfaces 212, each of which may comprise a wireless channel of physical communication layer. The connection may include an M2M connection, MTC connection, D2D connection, etc. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may communicate and establish a connection with (e.g., be communicatively coupled) with RAN 220, which may involve one or more wireless channels 214-1 and 214-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 210, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of RAN node 222.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection may comprise a local wireless connection, such as a connection consistent with any IEEE 702.11 protocol, and AP 216 may comprise a wireless fidelity (Wi-Fi®) router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

RAN 220 may include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells. As described below, in some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and to implementation where the base station, RAN node 222, etc., is a non-terrestrial network node (e.g., satellite 260).

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtu- alized framework may allow freed-up processor cores of RAN nodes 222 to perform or execute other virtualized applications.

In some implementations, an individual RAN node 222 may represent individual gNB-distributed units (DUs) con- nected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 220 or by a server pool (e.g., a group of servers configured to share resources) in a similar manner as the CRAN/vBBUP. Addi- tionally, or alternatively, one or more of RAN nodes 222 may be next generation eNBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet sched- uling, and mobility management. UEs 210 may be config- ured to communicate using orthogonal frequency-division multiplexing (OFDM) communication signals with each other or with any of the RAN nodes 222 over a multicarrier communication channel in accordance with various com- munication techniques, such as, but not limited to, an OFDMA communication technique (e.g., for downlink com- munications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 222 to UEs 210, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are con- veyed using such resource blocks.

As shown, RAN 220 may be connected (e.g., communi- catively coupled) to CN 230. CN 230 may comprise a plurality of network elements 232, which are configured to offer various data and telecommunications services to cus- tomers/subscribers (e.g., users of UEs 210) who are con- nected to the CN 230 via the RAN 220. In some implemen- tations, CN 230 may include an evolved packet core (EPC), a 5G CN, and/or one or more additional or alternative types of CNs. The components of the CN 230 may be imple- mented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtu- alization (NFV) architectures and infrastructures may be used to virtualize one or more network functions, alterna- tively performed by proprietary hardware, onto physical resources comprising a combination of industry-standard server hardware, storage hardware, or switches. In other words, NFV systems may be used to execute virtual or reconfigurable implementations of one or more EPC com- ponents/functions.

As shown, CN 230, application servers 240, and external networks 250 may be connected to one another via inter- faces 234, 236, and 238, which may include IP network interfaces. Application servers 240 may include one or more server devices or network elements (e.g., virtual network functions (VNFs) offering applications that use IP bearer resources with CN 230 (e.g., universal mobile telecommu- nications system packet services (UMTS PS) domain, LTE PS data services, etc.). Application servers 240 may also, or alternatively, be configured to support one or more commu- nication services (e.g., voice over IP (VoIP sessions, push- to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

As shown, example network 200 may include an NTN that may comprise one or more satellites 260-1 and 260-2 (collectively, "satellites 260"). Satellites 260 may be in communication with UEs 210 via service link or wireless interface 262 and/or RAN 220 via feeder links or wireless interfaces 264 (depicted individually as 264-1 and 264-2). In some implementations, satellite 260 may operate as a passive or transparent network relay node regarding communications between UE 210 and the terrestrial network (e.g., RAN 220). In some implementations, satellite 260 may operate as an active or regenerative network node such that satellite 260 may operate as a base station to UEs 210 (e.g., as a gNB of RAN 220) regarding communications between UE 210 and RAN 220. In some implementations, satellites 260 may communicate with one another via a direct wireless interface (e.g., 266) or an indirect wireless interface (e.g., via RAN 220 using interfaces 264-1 and 264-2).

Additionally, or alternatively, satellite 260 may include a GEO satellite, LEO satellite, or another type of satellite. Satellite 260 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 260 may operate as bases stations (e.g., RAN nodes 222) with respect to UEs 210. As such, references herein to a base station, RAN node 222, etc., may involve implementations where the base station, RAN node 222, etc., is a terrestrial network node and implementation, where the base station, RAN node 222, etc., is a non-terrestrial network node (e.g., satellite 260). As described herein, UE 210 and base station RAN nodes 222 may communicate with one another, via interface 214, to enable enhanced power saving techniques.

Regions and radio resources server 270 may include one or more servers, server devices, or network elements (e.g., VNFs) configured to send, receive, process, and/or store information. Regions and radio resources server 270 may communicate with CN 230 via connection or interface 272, which may include IP network interfaces. Regions and radio resources server 270 may include, manage, and/or have access to a database or another type of data repository, which may store one or more types of data. For example, regions and radio resources server 270 may collect and store a region ID associated with geographic location information (e.g., geographic coordinates defining a location and/or area) associated with a region (e.g., a city, county, state, province, country, venue (e.g., an airport, military installation, scientific research area, etc.) etc.).

Regions and radio resources server 270 may also collect and store radio resource information associated with one or more regions. Examples of radio resource information may include one or more RFs, bands, bandwidths, channels, Tx power information, etc., associated with D2D or V2X communications for a corresponding region. Regions and radio resources server 270 may receive this information from a network operator or another type of user operating a user terminal that is local or remote to the regions and radio resources server 270. Additionally, or alternatively, regions and radio resources server 270 may be configured to distribute the stored information to one or more UEs 210 (e.g., vehicles) according to a pre-defined schedule, in response to an operator's instruction to disseminate updated information, in response to a detected trigger (e.g., in combination with an application or operating system update provided to UEs 210, etc. Additionally, UE 210 may store the regions and radio resources information locally prior to operations, which may enable UE 210 to perform V2X communications via PC5 as described herein.

Figure 3:
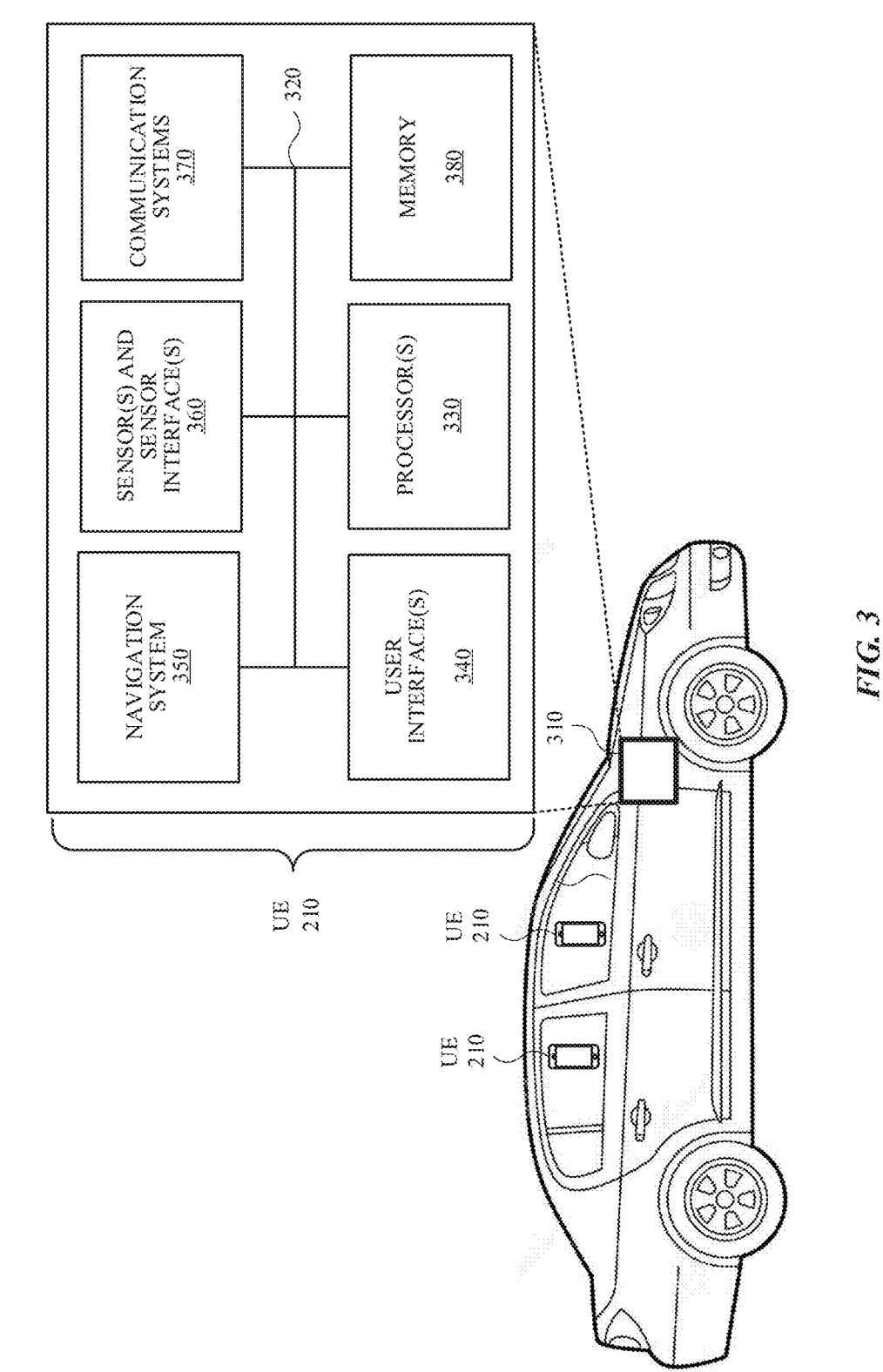
FIG. 3 is a diagram of an example vehicle according to one or more implementations described herein.

FIG. 3 is a diagram of an example vehicle 300 according to one or more implementations described herein. As shown, vehicle 300 may include vehicle control system 310 that includes communication circuitry 320, processor 330, user interfaces 340, navigation system 350, sensors and sensor interfaces 360, wireless systems 370, and memory 380. The components (310-380) of vehicle 300 may be implemented as hardware, software, and/or a combination of hardware and software (e.g., processors, memory, storage devices, data transport circuitry, interface circuitry, software programs and instructions, etc.). In some implementations, vehicle 300 may include one or more fewer, additional, differently ordered and/or arranged components and/or circuitry than shown in FIG. 3. Additionally, or alternatively, one or more operations or functions of any of the components of vehicle 300, or any additional or alternative operations or functions, may be performed by another component, a combination of components, consolidated into a single component, etc. As such, vehicle 300 and the components and circuitry depicted in FIG. 3, are provided as a non-limiting example that may be used to implement one or more of the techniques described herein.

Communication/interface circuitry 320 may permit communication among the components of vehicle control system 310. Processor 330 may include one or more processors, circuitry, and/or memory components configured to provide general management, synchronize, control, access, and coordination to the components, systems, and subsystems of vehicle 300. Processor 330 may provide a platform through which components of vehicle 300 may be accessed, tested, installed, registered, updated, etc. Processor 330 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 330 may control the overall operation, or a portion thereof, of vehicle 300, based on, for example, an operating system (not illustrated) various applications and/or logic circuits of vehicle control system 310. Processor 330 may access instructions from memory 280, from other components of vehicle control system 310, or from a source external to vehicle control system 310 (e.g., a network, one/or more UEs 210, one or more auxiliary device, etc.).

User interface 340 may include an interface through which a user (e.g., a driver) may input information and/or receive output information. User interface 340 may include physical features, such as buttons, nobs, switches, and other features through which the user may interact physically. User interface 340 may include audio and/or visual features, such as microphones, speakers, lights, electronic screens, etc., through which the user may both receive information (e.g., audio and/or visual) and/or input information (e.g., via a microphone, screen-pressable buttons or other screen interface objects, etc.). User interface 340 may enable the user to change climate control settings, engage vehicle security features, control windows, seats, mirrors, entertainment system settings, and other features of vehicle 300. User interface 340 may enable the user access mobile applications and services, record and/or trigger user preferences, initiate and cancel vehicle operations, etc.

Navigation system 350 may include hardware and/or software configured to enable navigation features and services of vehicle 300. Navigation system 350 may operate in conjunction with one or more of processor 330, user interface 340, sensors and sensor interfaces 360, communication systems 370, and memory 380 to provide navigation services. For example, navigation system 350 may receive an input to determine a route, arrival time, etc., corresponding to a destination received from a user, via user interface 340, and a current geographic location determined by navigation system 350. The geographic location may be determined based on network information received from access points 216, base stations RAN nodes 222, satellites 260, etc. as shown in FIG. 2. Navigation system 350 may also, or alternatively, coordinate with sensors and sensor interfaces 360 to implement driverless navigation services by, for example, receiving information from cameras, microphones, wireless output/input devices, etc., comparing the information with a current location, speed, route, and intended destination to control the vehicle in a complementary manner. Sensors and sensor interfaces 360 may include cameras, microphones, wireless output/input devices, tire pressure sensors, various engine monitoring sensors, accelerometers, etc., to monitor conditions relating to vehicle 300 and provide the components of vehicle control system 310 with inputs required to perform various functions.

Communication systems 370 may include one or more components that permit vehicle 300 to communicate with other devices and/or networks. For example, communication systems 370 may include one or more types of wireless and/or wired features, including processors, memory, baseband circuitry, RF circuitry, front-end module (FEM), antennas, etc., to communicate with APs 216 via interface 218, base stations RAN nodes 222 via interface 214, satellites 260 via interface 264, and other vehicles or UEs 210 via interface 212, as shown in FIG. 2.

Memory 380 may include a memory and/or storage device. For example, memory 380 may include random access memory (RAM), dynamic RAM (DRAM), read-only memory (ROM), programmable ROM (PROM), flash memory, or some other type of memory. Memory 380 may include a hard disk (e.g., a magnetic disk, an optical disk, a magneto-optic disk, a solid state disk, etc.) or some other type of computer-readable medium, along with a corresponding drive. Memory 380 may store software, data, instructions, and other information to enable operation of the components of vehicle control system 310. A computer-readable medium may be defined as a non-transitory memory device. A memory device may include space within a single physical memory device or spread across multiple physical memory devices.

As described herein, vehicle control system 310 may perform certain operations in response to processor 330 executing software instructions contained in a computer-readable medium, such as memory 380. The software instructions may be read into memory 380 from another computer-readable medium or from another device via communication interface 370. The software instructions contained in memory 380 may cause processor 330 to perform one or more processes described herein. Alternatively, hardwired circuitry may be used in place of, or in combination with, software instructions to implement processes described herein. Examples of such process may include those described with reference to FIGS. 1, 4, 6, 8, 10, and more. Thus, implementations described herein are not limited to any specific combination of hardware circuitry and software.

Figure 4:
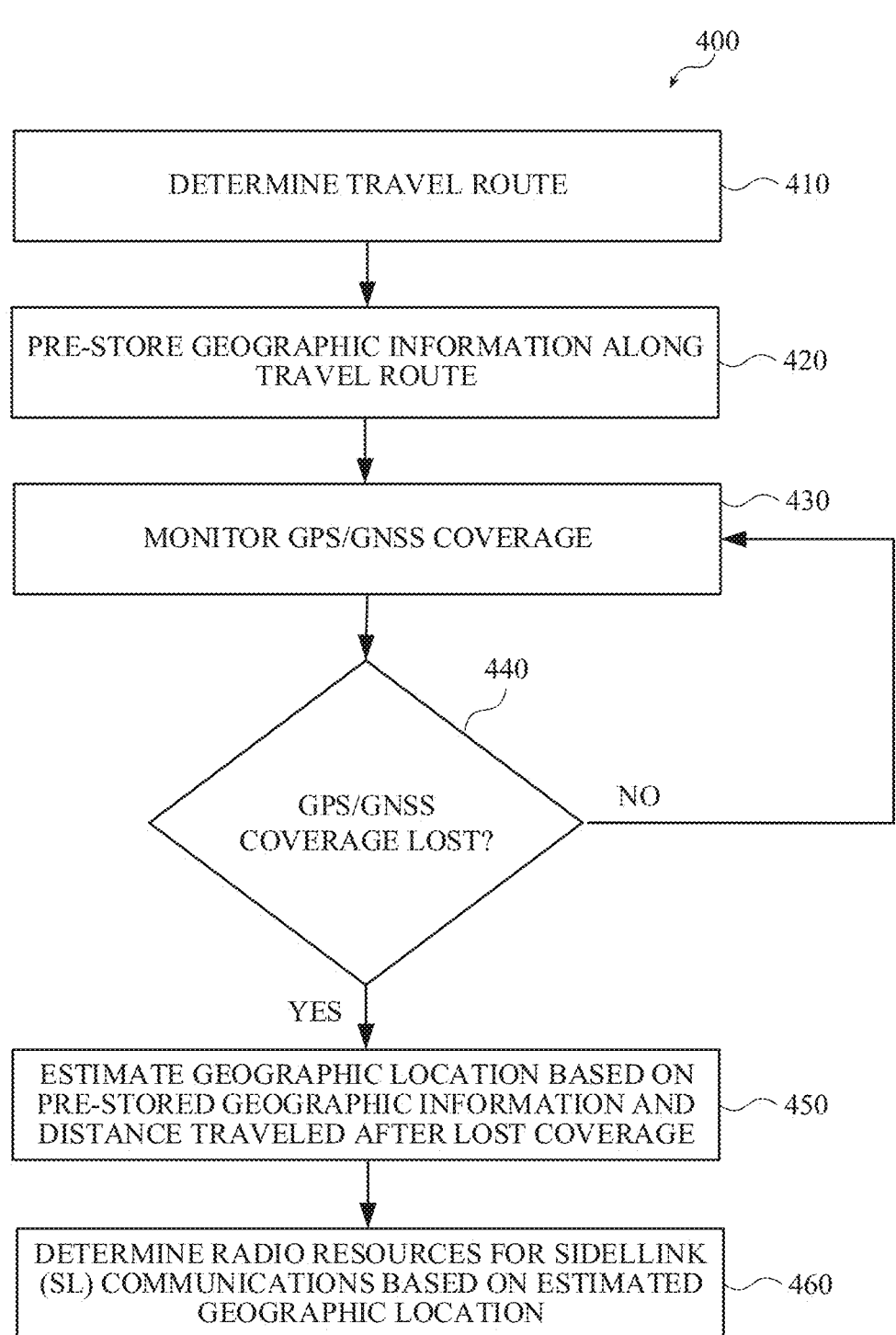
FIG. 4 is a diagram of an example process for intelligent radio resource selection for vehicle-to-everything (V2X) communications according to one or more implementations described herein.

FIG. 4 is a diagram of an example process 400 for intelligent radio resource selection for V2X communications according to one or more implementations described herein. Process 400 may be implemented by UE 210, vehicle 300, and/or one or more components of vehicle control system 310. In some implementations, some or all of process 400 may be performed by one or more other systems or devices, including one or more of the devices of FIG. 2, such as satellite 260. Additionally, process 400 may include one or more fewer, additional, differently ordered and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations or process depicted in FIG. 4.

As shown, process 400 may include determining a travel route (block 410). For example, vehicle control system 310 may provide a graphical user interface to a user and the user may access a navigation or mapping service installed on the vehicle control system 310. The user may designate a destination to which the user would like to travel, and vehicle control system 310 may respond by determining a travel route for traveling from a current location of vehicle 300 to the dentition. As vehicle travels along the travel route, vehicle control system 310 may communicate with one or more networks (e.g., a GPS network, GNSS network, etc.) to monitor the changing locations of vehicle 300 along the travel route, update the travel route as needed, etc.

Process 400 pre-storing geographic information along the travel route (block 420). For example, vehicle control system 310 may determine geographic coordinates along the travel route. Each set of geographic coordinates may be separated by a pre-defined distance (D). For example, a same distance can be selected between each set of geographic coordinates. In some implementations, the vehicle control system 310 may also determine whether the travel route, and/or which geographic coordinates along the travel route, pass from one geographic area (e.g., one country) into another geographic area (e.g., another country) that use different physical resources for SL communications). As described herein, this may enable vehicle control system 310 to determine whether one or more additional processes or operations, described herein, should be implemented. For instance, when the travel route does not involve (and/or is not near) areas that use different RFs for SL communications, vehicle control system 310 may not monitor GPS/GNSS coverage for purposes of estimating a current geographic location of vehicle 300 and determining SL radio resources if/when GPS/GNSS coverage is lost.

Process 400 may include monitoring GPS/GNSS coverage (block 430). For example, vehicle control system 310 may monitor a GPS/GNSS signal strength as vehicle 300 travels along the travel route. So long as GPS/GNSS coverage continues (block 440—No), process 400 may continue to include monitoring GPS/GNSS coverage (block 430). When GPS/GNSS coverage is lost (block 440—Yes), process may include estimating a geographic location of vehicle 300 based on the pre-stored geographic information and a distance traveled after coverage was lost or after the latest pre-store of the geographic information (block 450). For example, in response to detecting that the GPS/GNSS signal was lost or fell below a pre-selected signal strength threshold, vehicle control system 310 may estimate a current geographic location of vehicle 300 based on the most recent set of pre-stored GPS/GNSS coordinates through which vehicle 300 traveled and a distance traveled since those coordinates. The vehicle control system 310 may determine the distance based on a duration of time and travel velocity measured since the last set of pre-stored coordinates through which the vehicle traveled.

Process 400 may include determining radio resources for SL communications based on the estimated geographic location (block 460). In some aspects, SL resource configuration is pre-stored, pre-configured or provided to vehicle 300. The SL resource configuration provides available radio resources depending on the service and the geographical area. For example, the SL resource configuration may specify a list of frequencies that can be used for a service within a list of geographical areas. Based on the SL resource configuration, when a SL communication is initiated for that service, vehicle 300 may select or be scheduled an available frequency based on the estimated geographic location as provided above. By computing the estimated geographic location, radio resources for SL communication can be identified even when the actual geographic location information is not available. In some aspects, the estimated geographic location is computed as soon as the actual geographic location information is not available or it is determined GPS/GNSS coverage is lost. In some other aspects, the estimated geographic location is computed when vehicle 300 travels a pre-determined distance after the last pre-store of the geographic information and it is determined GPS/GNSS coverage is lost. In some further aspects, the geographic location is estimated when a SL communication is desired and it is determined GPS/GNSS coverage being lost or the stored GPS/GNSS coordinates being expired.

As another example, vehicle control system 310 may compare geographic coordinates of the estimated geographic location with locally stored information or records that associate geographic areas with radio resources used for SL communications. In so doing, vehicle control system 310 may determine which radio resources (e.g., bands, frequencies, channels, etc.) should be used for SL communication. As such, even when vehicle 300 is not within a coverage area of a wireless network (e.g., WiFi network, cellular network, or satellite network) vehicle control system 310 may still be able to engage in SL communications regardless of whether the radio resources for doing so have changed. In some implementations, vehicle control system 310 may determine radio resources for SL communications in response to a trigger, such as vehicle control system 310 determining that vehicle 300 has entered an area where different SL resources are used. In some implementations, the trigger may be a loss of the GPS/GNSS signal and/or one or more other wireless signals.

Figure 5:
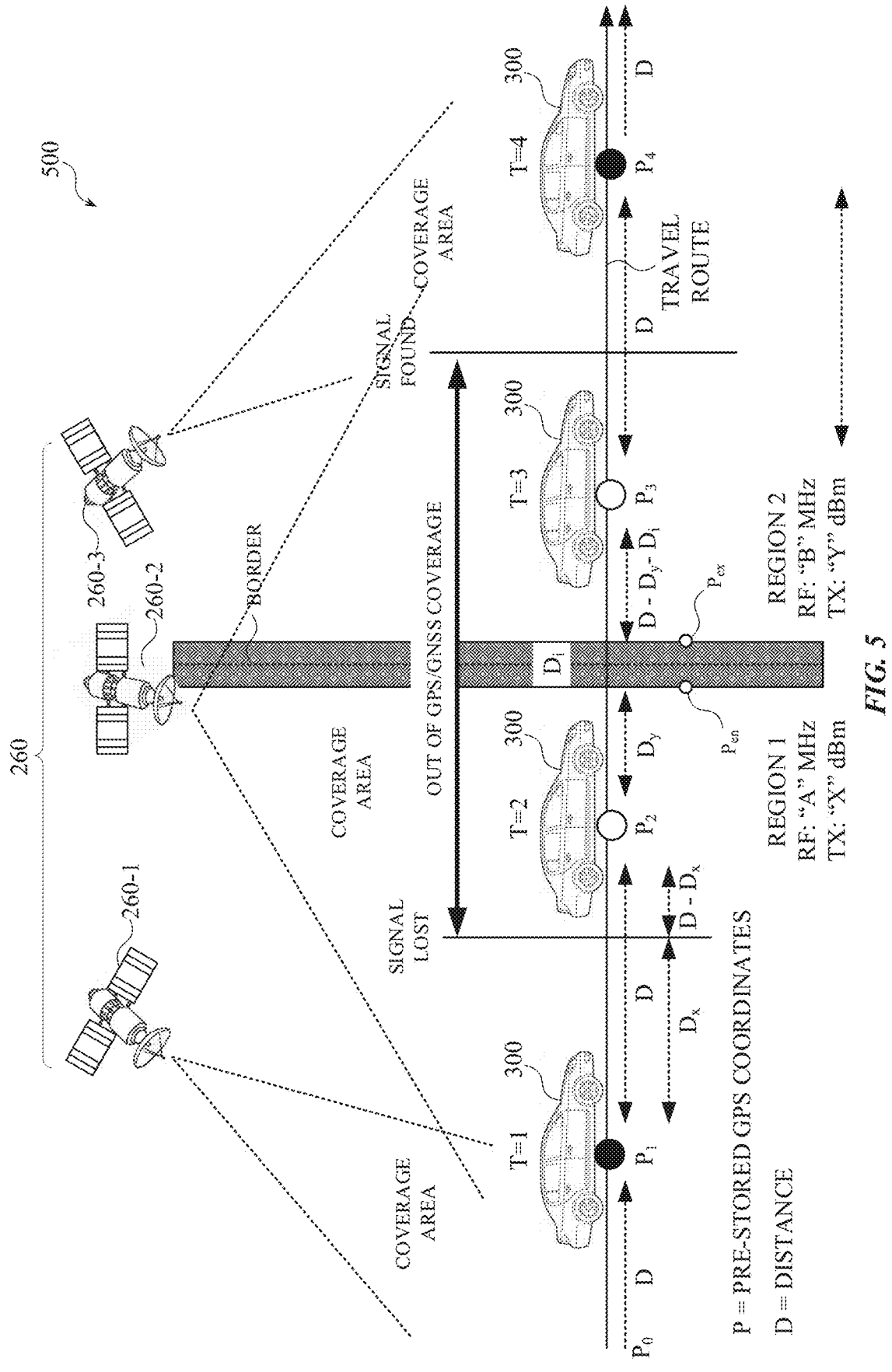
FIG. 5 is a diagram of an example of intelligent radio resource selection for V2X communications according to one or more implementations described herein.

FIG. 5 is a diagram of an example 500 of intelligent radio resource selection for V2X communications according to one or more implementations described herein. As shown, example 500 may include vehicle 300 and satellites 260. Vehicle 300 is moving along a travel route from region 1 and region 2 that are split by a border, which use different radio resources for SL communications. For example, region 1 uses "A" MHz RFs at "X" dBm transmission power, and region 2 uses "B" MHz RFs at "Y" dBm transmission power.

At time, T=1, vehicle 300 may be connected to a set of satellites 260 including 260-1 and 260-2 for example, which may enable a vehicle control system (not shown) of vehicle 300 to determine the current geographic location of vehicle 300. The vehicle control system may determine and store periodic positions (coordinates $P_0$, $P_1$, $P_2$, etc.) along the travel route based a pre-determined distance (D) between each position. The periodic positions can be stored at the beginning of the trip for the entire route by setting destination in the navigation or can be alternatively or additionally defined and/or adjusted during the travelling route. The periodic positions can also be defined according to a user setting. For example, the user can decide if cellular data usage is involved aside of GPS/GNSS signals. The distance (D) may be pre-stored, standardized, selected from a list of standardized values, and/or pre(configured) via a network device. The distance (D) may also depend on factors of vehicle 300 such as travel speed and/or the travel route. For example, the distance (D) may be set according to speed buckets. As an example, the distance (D) may be set to 0.5 mile if the vehicle speed is in a range of 10-30 mph, and 1 mile if the vehicle speed is in a range of 30-50 mph. In some other implementations, the distance (D) can be a fixed distance interval. In some implementations, the geographic locations are recorded by storing actions on the pre-determined distance (D). For example, vehicle 300 may restart measure a travel distance each time after vehicle 300 stores a position (e.g., $P_0$ as shown) and stores again when the travel distance reaches the pre-determined distance (D). As another example, vehicle 300 may restart measure a travel time each time after vehicle 300 stores a position (e.g., $P_0$ as shown) and stores again when the travel time reaches a value corresponding to traveling the pre-determined distance (D). In some implementations, the travel distance is normalized by direction and thus a direct distance on a specific direction is computed and considered.

The vehicle control system of vehicle 300 may monitor signals from multiple satellites 260 and determine, at T=2, that the signal has been lost. In some aspects, the signal is still deemed lost when the vehicle 300 is within a coverage area of one or more satellites such as the satellite 260-2 as shown, but does not have enough information to gain an accurate geographical location. In response, the vehicle control system may estimate the current geographic location of vehicle 300 based on a last pre-stored geographic (P=1) and a distance traveled (D) since the last pre-stored geographic location.

The vehicle control system may also determine, based on the estimated geographic location, that vehicle 300 is still in region 1 and therefore should use A MHz and X dBm as radio resources for SL communications. Later, at T=3, the vehicle control system may repeat a similar operation to estimate the current location of vehicle 300 and determine that B MHz and Y dBm should be used for SL communications because vehicle 300 is now located in region 2. Vehicle 300 may continue along the travel route and at T=4 detect a GPS/GNSS signal from the set of satellites 260 and revert to determining the current geographic location of vehicle 300 based on information from the set of satellites 260. In some scenarios, the same satellites are recovered to provide the current geographic location, while in other scenarios, one or more different or additional satellites such as satellite 260-3 as shown may join the set of satellites 260 to determine the current geographic location at T=4.

As shown, in some implementations, the vehicle control system may evaluate or determine the estimated geographic location of vehicle 300 in terms of $D_x$, $D_y$, $D_i$, $P_{en}$, $P_{ex}$, etc. The distance, $D_x$, may be a distance between a last stored GPS coordinate while in GPS coverage and a point where GPS coverage is lost. The distance, $D_y$, may be a distance between $P_1$ and $P_{en}$, where $P_{en}$ is a position of entrance to a buffer distance, $D_i$, of the border. Similarly, $P_{ex}$ may be an exit position on an opposite side of buffer distance $D_i$. The distance between $P_{ex}$ and $P_3$ may be D minus $D_y$ and $D_i$. In some implementations, when the estimated geographic location of vehicle 300 is within the buffer distance, $D_i$, of the border, the vehicle control system may be configured to assume that vehicle 300 is in a prior region (e.g., region 1) or a next region (e.g., region 2) and configure radio resources for SL communications accordingly. In some implementations, the vehicle control system may instead make no assumptions and repeat processes for estimating the geographic location of vehicle 300 at a faster pace or periodicity. In some implementations, when the estimated location of vehicle 300 is within the border buffer, the vehicle control system may refrain from engaging in SL communications until vehicle 300 has left the border buffer.

Figure 6:
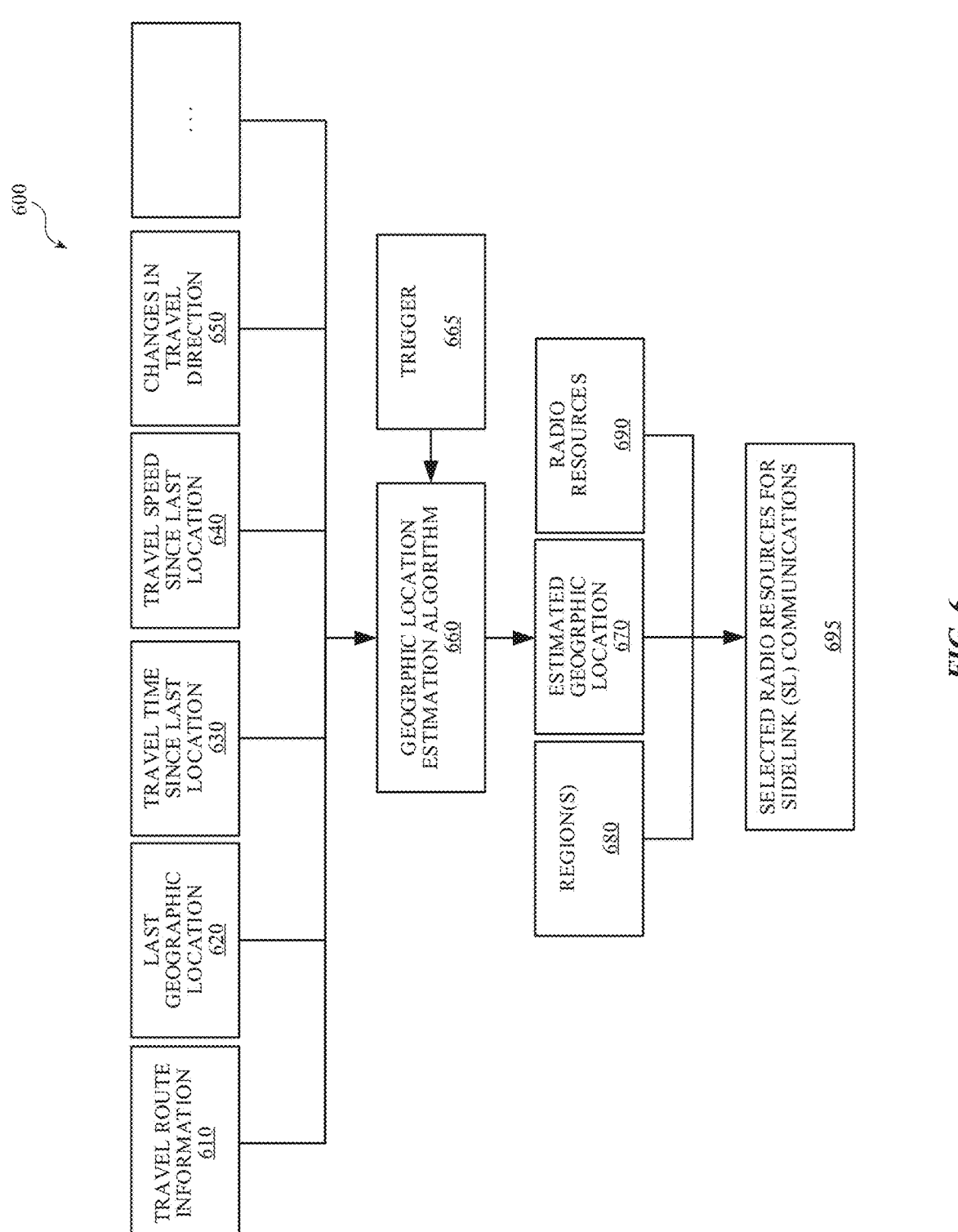
FIG. 6 is a diagram of an example of information and algorithms for intelligent radio resource selection for V2X communications according to one or more implementations described herein.

FIG. 6 is a diagram of an example 600 of information and algorithms for intelligent radio resource selection for V2X communications according to one or more implementations described herein. As shown, example 600 includes travel route information 610, last geographic location 620, travel time 630 since last location, travel speed 640 since last location, changes in travel direction since last location 650, geographic location estimation algorithm 660, trigger 665, estimated geographic location 670, regions 680, radio resources 690, and selected radio resources 695. In some implementations, example 600 may include one or more fewer, additional, differently ordered, and/or arranged types of information or algorithms than those shown in FIG. 6. Additionally, vehicle control system 310 (or UE 210) may store and/or use one or more types of information that differs from example 600. As such, example 600 is provided as non-limiting example of information and algorithms that may be used to implement one or more of the techniques described herein.

Travel route information may include a current location of vehicle 300, a destination of vehicle 300, and a path (e.g., streets, highways, freeways, etc.) for traveling to the destination. Travel route information may also include locations or positions along the travel route, separated by a pre-selected distance, that may be stored by a vehicle control system (not shown) of vehicle 300. In some implementations, the vehicle control system may be configured to determine the locations or positions at, or around, the time the travel route is determined, such that all positions are determined from the beginning. In some implementations, vehicle control system may determine the locations or positions based on detecting a trigger, such as a GPS/GSNN signal strength dropping below a threshold.

A last geographic location may include geographic coordinates or other types of information indication a last known location of vehicle 300. In some implementations, the last known geographic location may be the last location, of the pre-determined and pre-stored locations, along the travel route. A vehicle control system may determine and use the last geographic location to estimate a current geographic location after a GPS/GSNN signal has been lost and/or when no other suitable location data is available via another type of network infrastructure.

Travel time 630 and travel speed 640 since the last location may include an amount of time that has transpired, and the speed at which vehicle 300 has traveled, since vehicle 300 was at the last geographic location. The vehicle control system may determine a travel distance based on the travel time 630 and travel speed 640 and may use the travel distance to help estimated the current location of vehicle 300. In some implementations, vehicle control system may instead already monitor and collect a travel distance, which vehicle control system may use instead of travel time 630 and travel speed 640.

Change in travel direction may include information describing changes in a direction of travel (e.g., relative to the originally planned travel route. For example, vehicle 300 may diverge from the travel route after losing the GPS/GSNN signal. As such, the vehicle control system may record changes in travel directions of vehicle 300 and, in combination with travel time 630 and travel speed 640, to estimate the current location of vehicle 300. In some implementations, this may be achieved using one or more direction sensitive (e.g., compass system, accelerometer systems, etc., sensors of vehicle 300.

Geographic location estimation algorithm 660 may include information, software instructions, etc., that may be executed by one or more processors of the vehicle control system to estimate the location of vehicle 300. In some implementations, geographic location estimation algorithm 660 may estimate the geographic location of the vehicle in response to one or more conditions or triggers 665. Examples of such a trigger may be losing the GPS/GSNN signal, the GPS/GSNN signal strength falling below a threshold strength, a duration of time or distance traveled since the GPS/GSNN signal was lost, an estimated likelihood that vehicle 300 is has entered or is near an area that uses different radio resources for SL communications, etc.

Estimated geographic location 670 may be the output (e.g., geographic coordinates) of the geographic location estimation algorithm 660. Regions 680 may include a set of geographic information, coordinates, and/or other characteristics that describe a geographic area. Examples of a region may include a neighborhood, city, county, state, province, country, or venue, such as an airport, stadium, military installation, scientific research area, etc. Radio resources 690 may include information describing the radio resources used by a region for SL communications. Examples of radio resources may include physical radio resources, such as bands, frequencies, carriers, timing information, transmission power, etc. As shown, the vehicle control system may use the estimated geographic location 670, regions 680, and radio resources 690 to determine and select appropriate radio resources 695 for SL communications.

In some aspects, the regions 680 and the radio resources 690 are construed as part of SL resource configuration. The SL resource configuration includes a set of SL configuration parameters providing a mapping relation of zones/regions and corresponding radio resources assigned. The set of SL configuration parameters can be (pre)configured in a mobile equipment such as vehicle 300, configured in a universal subscriber identity module, provided by an application server or service provider, or a combination thereof. The set of SL configuration parameters may be updated on certain instances such as when a validity timer expires or vehicle 300 enter into a new geographical area or a different network. By providing estimated geographic location 670 when the actual geographic location information is not available, radio resources for SL communication can be determined based on the set of SL configuration parameters.

Figure 7:
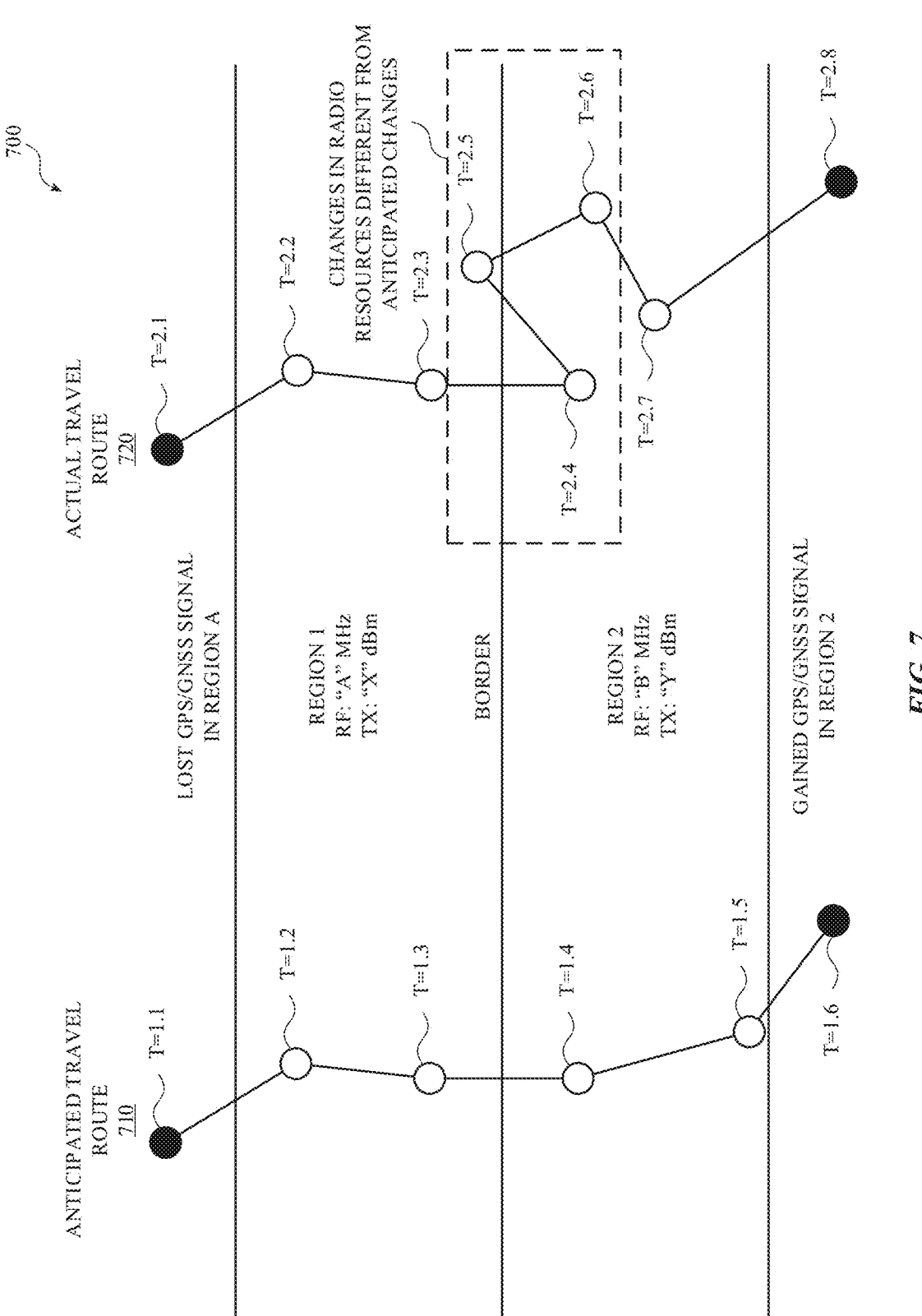
FIG. 7 is a diagram of an example of an anticipated travel path versus an actual travel path according to one or more implementations described herein.

FIG. 7 is a diagram of an example 700 of an anticipated travel route 710 versus an actual travel route 720 according to one or more implementations described herein. Anticipated travel route 710 includes a travel path determined by a navigation system of vehicle 300 based on a starting location of vehicle 300 and a destination. Anticipated travel route 710 includes several locations or positions that are each marked according to a time (T: 1.1 through 1.6) at which vehicle 300 is anticipated to be at the location. Similarly, actual travel route 720 includes the actual travel path taken by vehicle 300 and includes several locations or positions that are each marked according to a time (T: 2.1 through 2.8) at which vehicle 300 was there. Anticipated travel route 710 versus an actual travel route 720 each begin in region A and region B, which are divided by a border and use different radio resources for SL communications: RF "A" MHz and Tx "X" dBm for region 1, and RF "B" MHz and Tx "Y" dBm for region 2. Each route also includes times in which vehicle 300 loses a GPS/GNSS signal, traverses the border between region 1 and 2, and later regains a GPS/GNSS signal.

As shown, while vehicle 300 may have a pre-determined travel routes, vehicle 300 may vary that travel route after losing the GPS/GNSS signal (compare, for example, the locations of T: 1.3, 1.4, and 1.5 of anticipated travel route 710 with the locations of T: 2.3, 2.4, 2.5, 2.6, and 2.7 of actual travel route 720). Has shown, the changes to the travel route may even involve vehicle 300 crossing the border at different times, locations, and directions (e.g., from region 1 to region 2 and vice versa). Despite vehicle 300 losing the GPS/GNSS signal and diverging from the anticipated travel route, vehicle 300 may nevertheless continue to accurately estimate the locations of vehicle 300 (e.g., based on last know location, travel time, speed, and direction changes), determine where vehicle is location (e.g., in which regions), determine the appropriate radio resources for the region, and engaging in SL communications accordingly.

Figure 8:
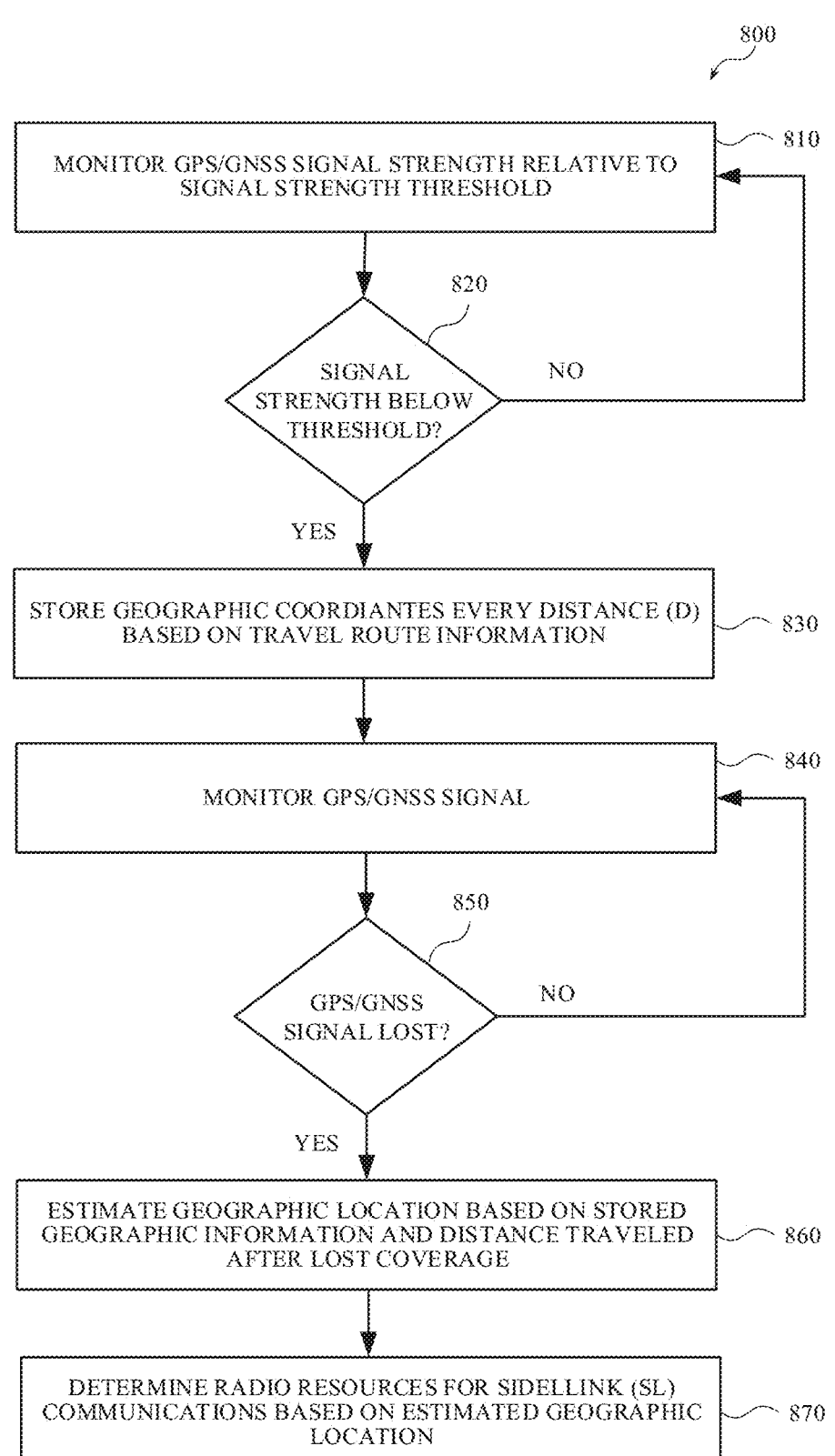
FIG. 8 is a diagram of an example of another process for intelligent radio resource selection for V2X communications according to one or more implementations described herein.

FIG. 8 is a diagram of an example of another process 800 for intelligent radio resource selection for V2X communications according to one or more implementations described herein. Process 800 may be implemented by UE 210, vehicle 300, and/or one or more components of vehicle control system 310. In some implementations, some or all of process 800 may be performed by one or more other systems or devices, including one or more of the devices of FIG. 2, such as satellite 260. Additionally, process 800 may include one or more fewer, additional, differently ordered and/or arranged operations than those shown in FIG. 8. In some implementations, some or all of the operations of process 800 may be performed independently, successively, simultaneously, etc., of one or more of the other operations of process 800. As such, the techniques described herein are not limited to a number, sequence, arrangement, timing, etc., of the operations or process depicted in FIG. 8.

As shown, process 800 may monitoring a GPS/GNSS signal strength relative to a pre-selected signal strength threshold (block 810). For example, vehicle control system 310 may establish and maintain a connection with GPS or GNSS satellite 260. Vehicle control system 310 may monitor a signal strength from satellite 260 and compare the signal strength to a pre-selected, or pre-defined signal strength threshold. When the signal strength does not fall below the pre-selected signal strength threshold (block 820—No) process 800 may continue with monitoring the GPS/GNSS signal strength relative to the pre-selected signal strength threshold (block 810). When the signal strength falls below the pre-selected signal strength threshold (block 820—Yes) process 800 may include storing geographic coordinates every distance (D) based on a current travel route (block 830). For example, vehicle control system 310 may determine the current travel route of vehicle 300, and determine periodic geographic coordinates, each separated by a pre-defined distance (D) along the travel route. The signal strength threshold may be such that vehicle control system

310 may remain in communication with the satellite even when the actual signal strength falls below the signal strength threshold.

Process 800 may continue to monitor the signal from GPS/GNSS satellite 260 (block 840). For example, vehicle control system 310 may continue to monitor the signal from GPS/GNSS satellite 260 even after the signal strength is below the signal strength threshold. So long as the GPS/GNSS satellite 260 signal is not lost (block 850—No), vehicle control system 310 may continue to monitor the GPS/SNSS satellite signal (block 840). When the GPS/GNSS satellite 260 signal is lost (block 850—Yes), process 800 may include estimating a geographic location based on stored geographic information and a distance travel after losing coverage (block 860). For example, vehicle control system 310 may determine the last known geographic location of vehicle 300 and estimate a current location of vehicle 300 based on a distance and direction travelled since the last known geographic location.

Process 800 may include determining radio resources for SL communications based on the estimated geographic location of vehicle 300 (block 870). For example, vehicle control system 310 may determine appropriate radio resources for SL communications based on the estimated geographic location of vehicle 300. In some implementations, this may include vehicle control system 310 comparing the estimated geographic location to information describing multiple regions and determining which region corresponds to the estimated geographic location. Vehicle control system 310 may then determine which radio resources to use for SL communications by determining which radio resources are associated with the region. The region information and radio resource information may be stored locally by vehicle control system 310 so that vehicle control system 310 may determine SL resource without needing a network connection.

Figure 9:
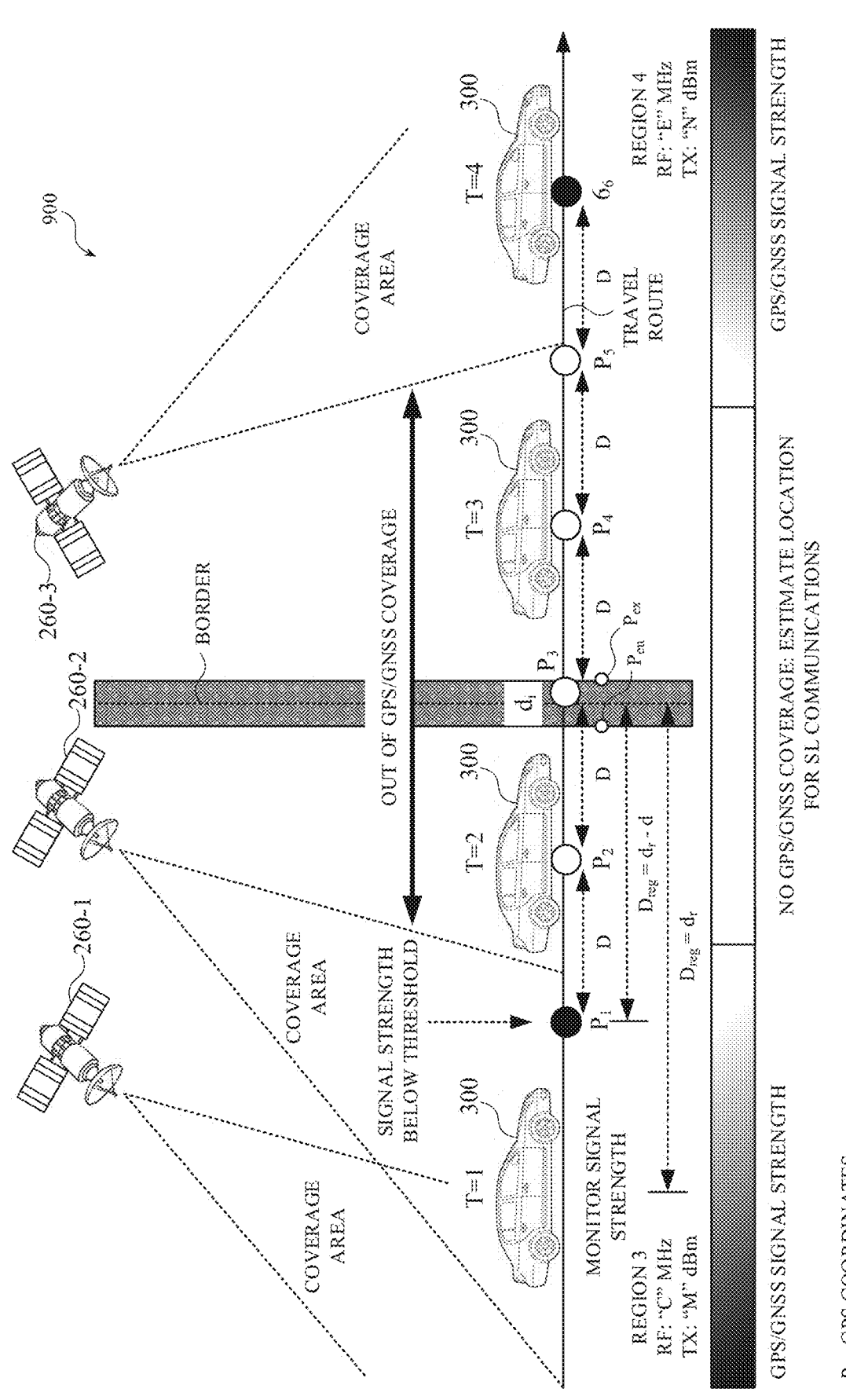
FIG. 9 is a diagram of an example of intelligent radio resource selection for V2X communications according to one or more implementations described herein.

FIG. 9 is a diagram of an example 900 of intelligent radio resource selection for V2X communications according to one or more implementations described herein. As shown, example 900 may include vehicle 300 and satellites 260. Vehicle 300 is moving along a travel route from region 3 and region 4 that are split by a border, which use different radio resources for SL communications. For example, region 3 may use "C" MHz RFs at "M" dBm transmission power, and region 4 may use "D" MHz RFs at "N" dBm transmission power.

At time, T=1, vehicle 300 may be connected to satellites 260-1 and 260-2, which may enable a vehicle control system (not shown) of vehicle 300 to determine the current geographic location of vehicle 300. The vehicle control system of vehicle 300 may monitor a signal strength from satellites 260 and determine, at around T=2, that the signal strength has fallen below a signal strength threshold. In response, the vehicle control system may determine the current geographic location $P_1$ of vehicle 300 based on the satellite (e.g., GPS/GSNN) signal. The vehicle control system may determine, based on a travel route previously entered into a navigation system of vehicle 300, periodic positions ($P_2$, $P_3$, etc.) along the travel route based a pre-determined distance (D) between each position.

The vehicle control system may continue to monitor the signal strength from satellite 260 and eventually determine that vehicle is no longer within a coverage area of satellites 260. In response, the vehicle control system may estimate the current geographic location of vehicle 300 based on a last pre-stored geographic ($P_1$) and a distance traveled (D) since the last pre-stored geographic location. The vehicle control system may also determine, based on the estimated geographic location, that vehicle 300 is still in region 3 and therefore should use C MHz and M dBm as radio resources for SL communications. Later, at T=3, the vehicle control system may repeat a similar operation to estimate the current location of vehicle 300 and determine that E MHz and N dBm should be used for SL communications because vehicle 300 is now located in region 4. Vehicle 300 may continue along the travel route and at T=4 detect a GPS/GNSS signal from satellite 260-3 and revert back to determining the current geographic location of vehicle 300 based on information from satellites 260.

As shown, in some implementations, the vehicle control system may evaluate or determine the estimated geographic location of vehicle 300 in terms of $D_{reg}$, $D_r$, $D_i$, $P_{en}$, $P_{ex}$, etc. The distance, $D_{reg}$, may be a distance to a region change (e.g., to a region with different physical resources. The distance, $D_r$, may be a distance between a point where GPS coordinate configurations start (based on the GPS/GNSS signal strength) and a region boundary. The distance, $D_i$, may be a buffer distance near a border (e.g., an area around the border where determining which physical resources should be used for SL communications may be vague unconfirmed). $P_{en}$ may be a position (e.g., coordinates of entry) to a buffer distance, $D_i$, of the border, and $P_{ex}$ may be an exit position (e.g., coordinates of exit) on an opposite side of buffer distance $D_i$. In some implementations, when the estimated geographic location of vehicle 300 is within the buffer distance, $D_i$, of the border, the vehicle control system may be configured to assume that vehicle 300 is in a prior region (e.g., region 3) or a next region (e.g., region 4) and configure radio resources for SL communications accordingly. In some implementations, the vehicle control system may instead make no assumptions and repeat processes for estimating the geographic location of vehicle 300 at a faster pace or periodicity. In some implementations, when the estimated location of vehicle 300 is within the border buffer, the vehicle control system may refrain from engaging in SL communications until vehicle 300 has left the border buffer.

Figure 10:
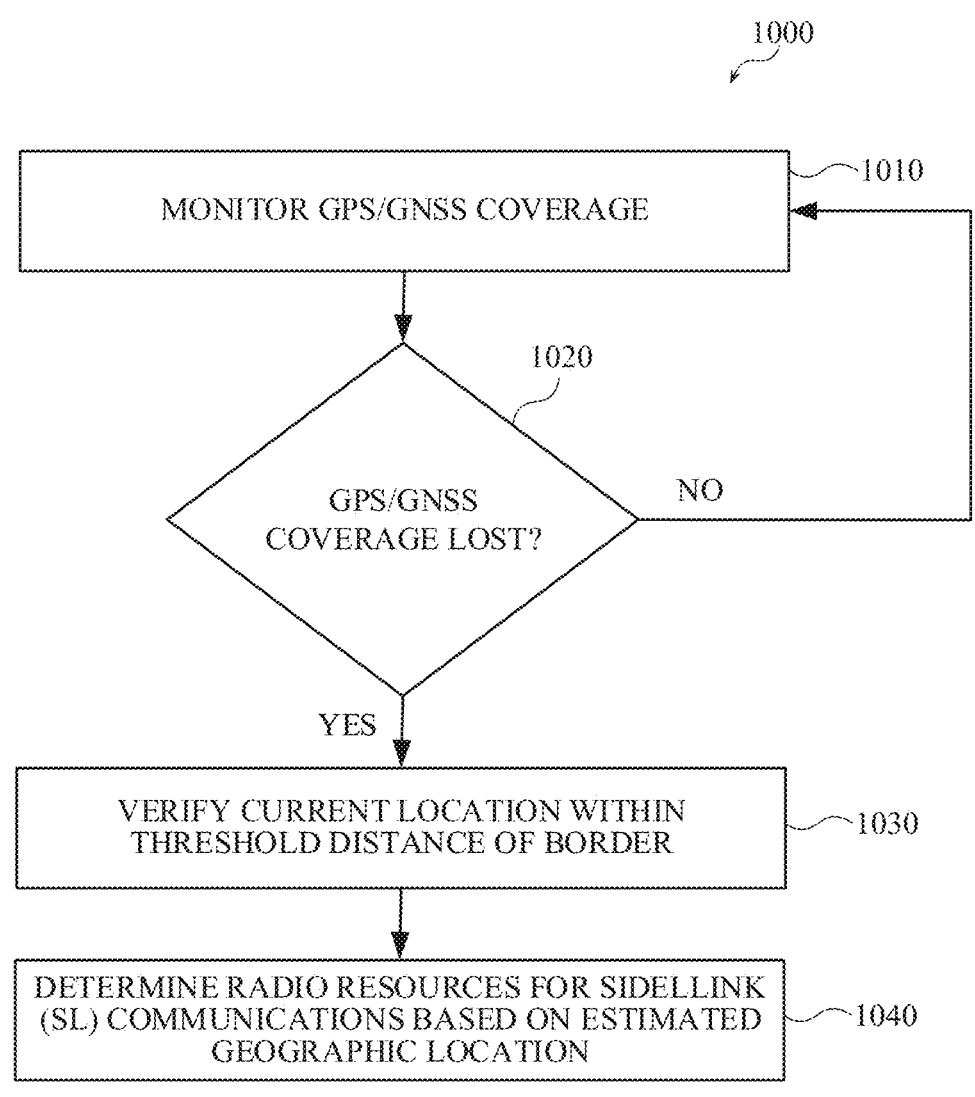
FIG. 10 is a diagram of an example process for determining whether to perform intelligent radio resource selection for V2X communications according to one or more implementations described herein.

FIG. 10 is a diagram of an example process for determining whether to perform intelligent radio resource selection for V2X communications according to one or more implementations described herein. Process 1000 may be implemented by UE 210, vehicle 300, and/or one or more components of vehicle control system 310. In some implementations, some or all of process 1000 may be performed by one or more other systems or devices, including one or more of the devices of FIG. 2, such as satellite 260. Additionally, process 1000 may include one or more fewer, additional, differently ordered and/or arranged operations than those shown in FIG. 10. In some implementations, some or all of the operations of process 1000 may be performed independently, successively, simultaneously, etc., of one or more of the other operations of process 1000. As such, the techniques described herein are not limited to a number, sequence, arrangement, timing, etc., of the operations or process depicted in FIG. 10.

As shown, process 1000 may include monitoring GPS/GNSS coverage (block 1010). For example, vehicle control system 310 may monitor a signal from, or connection to, satellite 260. So long as the signal is not lost (block 1020—No), vehicle control system 310 may continue to monitor the GPS/SNSS signal and coverage (block 1010). When the GPS/GNSS coverage is lost (block 1020—Yes), process 1000 may include verifying that a current geographic location is within a threshold distance of a border (block 1030). For example, in response to determining that a GPS/GNSS signal or coverage has been lost, vehicle control system 310 may determine a current location (or a last known location) of vehicle 300 and determine a distance between the current location and a border that vehicle 300 may cross per an existing travel route. When the distance between the current location and the border is greater than a distance threshold, vehicle control system 310 may not proceed with bother with estimating locations of vehicle 300 in the future to determine if/when different radio resources for SL communications should be used. By contrast, when the distance between the current location and the border is not greater than the distance threshold, process 1000 may proceed by determining radio resources for SL communications based on the estimated geographic location of vehicle 300 (block 1040). For example, vehicle control system 310 may determine appropriate radio resources for SL communications based on the estimated geographic location of vehicle 300. In some implementations, this may include vehicle control system 310 comparing the estimated geographic location to information describing multiple regions and determining which region corresponds to the estimated geographic location. Vehicle control system 310 may then determine which radio resources to use for SL communications by determining which radio resources are associated with the region. The region information and radio resource information may be stored locally by vehicle control system 310 so that vehicle control system 310 may determine SL resource without needing a network connection.

Figure 11:
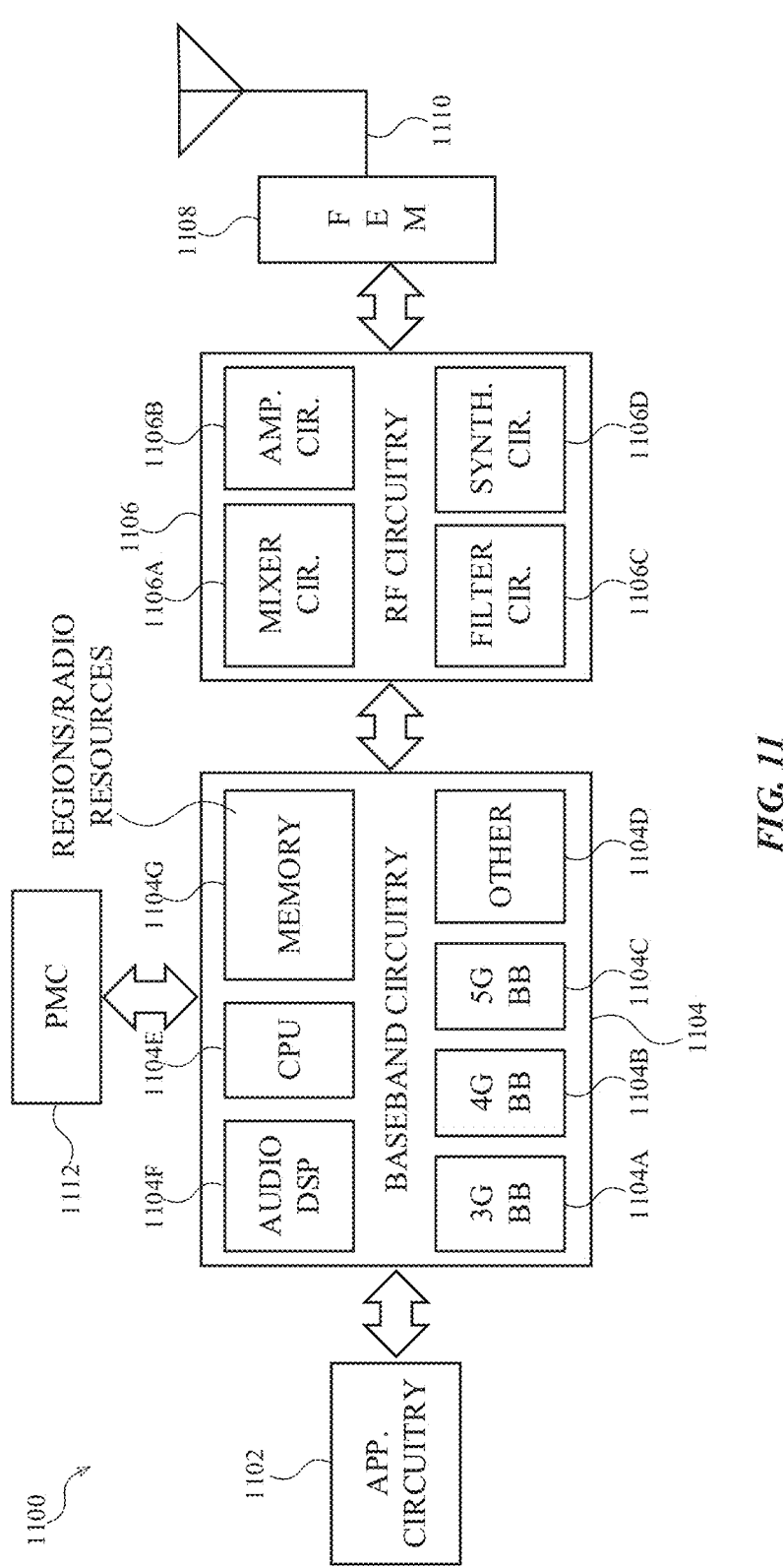
FIG. 11 is a diagram of an example of components of a device according to one or more implementations described herein.

FIG. 11 is a diagram of an example of components of a device according to one or more implementations described herein. In some implementations, the device 1100 can include application circuitry 1102, baseband circuitry 1104, RF circuitry 1106, front-end module (FEM) circuitry 1108, one or more antennas 1110, and power management circuitry (PMC) 1112 coupled together at least as shown. The components of the illustrated device 1100 can be included in a UE or a RAN node. In some implementations, the device 1100 can include fewer elements (e.g., a RAN node may not utilize application circuitry 1102, and instead include a processor/controller to process IP data received from a CN or an Evolved Packet Core (EPC)). In some implementations, the device 1100 can include additional elements such as, for example, memory/storage, display, camera, sensor (including one or more temperature sensors, such as a single temperature sensor, a plurality of temperature sensors at different locations in device 1100, etc.), or input/output (I/O) interface. In other implementations, the components described below can be included in more than one device (e.g., said circuitries can be separately included in more than one device for Cloud-RAN (C-RAN) implementations).

The application circuitry 1102 can include one or more application processors. For example, the application circuitry 1102 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1100. In some implementations, processors of application circuitry 1102 can process IP data packets received from an EPC.

The baseband circuitry 1104 can include circuitry such as, but not limited to, one or more single-core or multi-core processors. The baseband circuitry 1104 can include one or more baseband processors or control logic to process baseband signals received from a receive signal path of the RF circuitry 1106 and to generate baseband signals for a transmit signal path of the RF circuitry 1106. Baseband circuitry 1104 can interface with the application circuitry 1102 for generation and processing of the baseband signals and for controlling operations of the RF circuitry 1106. For example, in some implementations, the baseband circuitry 1104 can include a 3G baseband processor 1104A, a 4G baseband processor 1104B, a 5G baseband processor 1104C, or other baseband processor(s) 1104D for other existing generations, generations in development or to be developed in the future (e.g., 5G, 6G, etc.). The baseband circuitry 1104 (e.g., one or more of baseband processors 1104A-D) can handle various radio control functions that enable communication with one or more radio networks via the RF circuitry 1106. In other implementations, some or all of the functionality of baseband processors 1104A-D can be included in modules stored in the memory 1104G and executed via a Central Processing Unit (CPU) 1104E. The radio control functions can include, but are not limited to, signal modulation/demodulation, encoding/decoding, radio frequency shifting, etc. In some implementations, modulation/demodulation circuitry of the baseband circuitry 1104 can include Fast-Fourier Transform (FFT), precoding, or constellation mapping/de-mapping functionality. In some implementations, encoding/decoding circuitry of the baseband circuitry 1104 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1104G may store regions and radio resources information. Regions and radio resources information may include a region ID associated with geographic location information (e.g., geographic coordinates defining a location and/or area) associated with a region (e.g., a city, county, state, province, country, venue (e.g., an airport, military installation, scientific research area, etc.) etc.). Regions and radio resources information may information associated with one or more regions, such as one or more RFs, bands, bandwidths, channels, Tx power information, etc., associated with D2D or V2X communications for a corresponding region. UE 210 (e.g., vehicle 300) with baseband circuitry 1104 may use the regions and radio resources information to perform one or more operations described herein, such as determining the radio resources that should be used for SL communications based on a location of UE 210 (e.g., vehicle 300).

In some implementations, the baseband circuitry 1104 can include one or more audio digital signal processor(s) (DSP) 1104F. The audio DSPs 1104F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1104 and the application circuitry 1102 can be implemented together such as, for example, on a system on a chip (SOC).

In some implementations, the baseband circuitry 1104 can provide for communication compatible with one or more radio technologies. For example, in some implementations, the baseband circuitry 1104 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1104 is configured to support radio communications of more than one wireless protocol can be referred to as multi-mode baseband circuitry.

RF circuitry 1106 can enable communication with wireless networks using modulated electromagnetic radiation through a non-solid medium. In various implementations, the RF circuitry 1106 can include switches, filters, amplifiers, etc. to facilitate the communication with the wireless network. RF circuitry 1106 can include a receive signal path which can include circuitry to down-convert RF signals received from the FEM circuitry 1108 and provide baseband signals to the baseband circuitry 1104. RF circuitry 1106 can also include a transmit signal path which can include circuitry to up-convert baseband signals provided by the baseband circuitry 1104 and provide RF output signals to the FEM circuitry 1108 for transmission.

In some implementations, the receive signal path of the RF circuitry 1106 can include mixer circuitry 1106A, amplifier circuitry 1106B and filter circuitry 1106C. In some implementations, the transmit signal path of the RF circuitry 1106 can include filter circuitry 1106C and mixer circuitry 1106A. RF circuitry 1106 can also include synthesizer circuitry 1106D for synthesizing a frequency for use by the mixer circuitry 1106A of the receive signal path and the transmit signal path. In some implementations, the mixer circuitry 1106A of the receive signal path can be configured to down-convert RF signals received from the FEM circuitry 1108 based on the synthesized frequency provided by synthesizer circuitry 1106D. The amplifier circuitry 1106B can be configured to amplify the down-converted signals and the filter circuitry 1106C can be a low-pass filter (LPF) or band-pass filter (BPF) configured to remove unwanted signals from the down-converted signals to generate output baseband signals. Output baseband signals can be provided to the baseband circuitry 1104 for further processing. In some implementations, the output baseband signals can be zero-frequency baseband signals, although this is not a requirement. In some implementations, mixer circuitry 1106A of the receive signal path can comprise passive mixers, although the scope of the implementations is not limited in this respect.

In some implementations, the mixer circuitry 1106A of the transmit signal path can be configured to up-convert input baseband signals based on the synthesized frequency provided by the synthesizer circuitry 1106D to generate RF output signals for the FEM circuitry 1108. The baseband signals can be provided by the baseband circuitry 1104 and can be filtered by filter circuitry 1106C.

In some implementations, the mixer circuitry 1106A of the receive signal path and the mixer circuitry 1106A of the transmit signal path can include two or more mixers and can be arranged for quadrature down conversion and up conversion, respectively. In some implementations, the mixer circuitry 1106A of the receive signal path and the mixer circuitry 1106A of the transmit signal path can include two or more mixers and can be arranged for image rejection (e.g., Hartley image rejection). In some implementations, the mixer circuitry 1106A of the receive signal path and the mixer circuitry 1406A can be arranged for direct down conversion and direct up conversion, respectively. In some implementations, the mixer circuitry 1106A of the receive signal path and the mixer circuitry 1106A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1106 can include analog-to-digital converter (ADC) and digital-to-analog converter (DAC) circuitry and the baseband circuitry 1104 can include a digital baseband interface to communicate with the RF circuitry 1106.

In some dual-mode implementations, a separate radio IC circuitry can be provided for processing signals for each spectrum, although the scope of the implementations is not limited in this respect.

In some implementations, the synthesizer circuitry 1106D can be a fractional-N synthesizer or a fractional N/N+1 synthesizer, although the scope of the implementations is not limited in this respect as other types of frequency synthesizers can be suitable. For example, synthesizer circuitry 1106D can be a delta-sigma synthesizer, a frequency multiplier, or a synthesizer comprising a phase-locked loop with a frequency divider.

The synthesizer circuitry 1106D can be configured to synthesize an output frequency for use by the mixer circuitry 1106A of the RF circuitry 1106 based on a frequency input and a divider control input. In some implementations, the synthesizer circuitry 1106D can be a fractional N/N+1 synthesizer.

In some implementations, frequency input can be provided by a voltage-controlled oscillator (VCO), although that is not a requirement. Divider control input can be provided by either the baseband circuitry 1104 or the applications circuitry 1102 depending on the desired output frequency. In some implementations, a divider control input (e.g., N) can be determined from a look-up table based on a channel indicated by the applications circuitry 1102.

Synthesizer circuitry 1106D of the RF circuitry 1106 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1106D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1106 can include an IQ/polar converter.

FEM circuitry 1108 can include a receive signal path which can include circuitry configured to operate on RF signals received from one or more antennas 1110, amplify the received signals and provide the amplified versions of the received signals to the RF circuitry 1106 for further processing. FEM circuitry 1108 can also include a transmit signal path which can include circuitry configured to amplify signals for transmission provided by the RF circuitry 1106 for transmission by one or more of the one or more antennas 1110. In various implementations, the amplification through the transmit or receive signal paths can be done solely in the RF circuitry 1106, solely in the FEM circuitry 1108, or in both the RF circuitry 1106 and the FEM circuitry 1108.

In some implementations, the FEM circuitry 1108 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1106). The transmit signal path of the FEM circuitry 1108 can include a power amplifier (PA) to amplify input RF signals (e.g., provided by RF circuitry 1106), and one or more filters to generate RF signals for subsequent transmission (e.g., by one or more of the one or more antennas 1110).

In some implementations, the PMC 1112 can manage power provided to the baseband circuitry 1104. In particular, the PMC 1112 can control power-source selection, voltage scaling, battery charging, or DC-to-DC conversion. The PMC 1112 can often be included when the device 1100 is capable of being powered by a battery, for example, when the device is included in a UE. The PMC 1112 can increase the power conversion efficiency while providing desirable implementation size and heat dissipation characteristics.

While FIG. 11 shows the PMC 1112 coupled only with the baseband circuitry 1104. However, in other implementations, the PMC 1112 may be additionally or alternatively coupled with, and perform similar power management operations for, other components such as, but not limited to, application circuitry 1102, RF circuitry 1106, or FEM circuitry 1108.

In some implementations, the PMC 1112 can control, or otherwise be part of, various power saving mechanisms of the device 1100. For example, if the device 1100 is in an RRC_Connected state, where it is still connected to the RAN node as it expects to receive traffic shortly, then it can enter a state known as Discontinuous Reception Mode (DRX) after a period of inactivity. During this state, the device 1100 can power down for brief intervals of time and thus save power.

If there is no data traffic activity for an extended period of time, then the device 1100 can transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1102 and processors of the baseband circuitry 1104 can be used to execute elements of one or more instances of a protocol stack. For example, processors of the baseband circuitry 1104, alone or in combination, can be used execute Layer 3, Layer 2, or Layer 1 functionality, while processors of the baseband circuitry 1104 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 12:
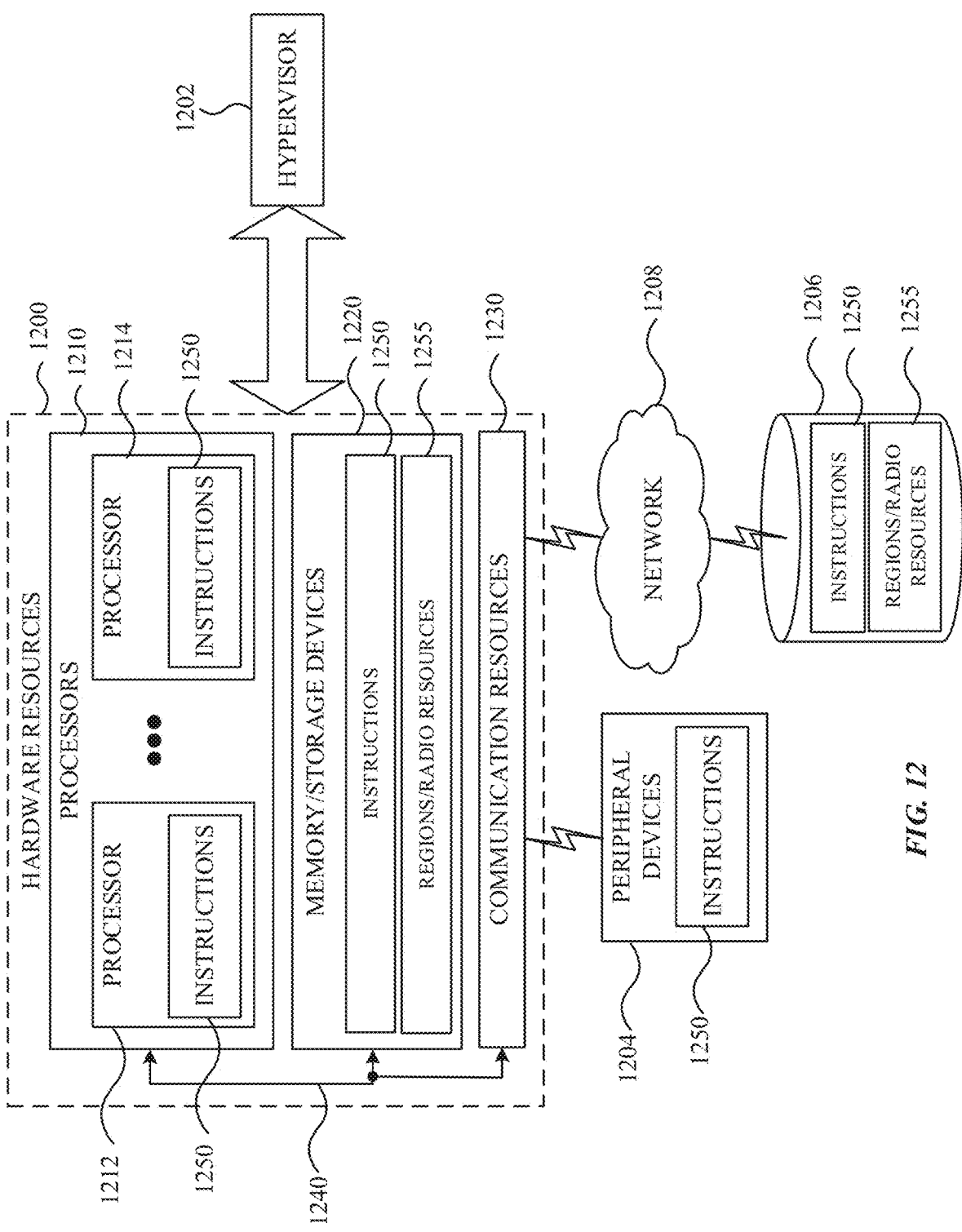
FIG. 12 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1220 may store regions and radio resources information. Regions and radio resources information may include a region ID associated with geographic location information (e.g., geographic coordinates defining a location and/or area) associated with a region (e.g., a city, county, state, province, country, venue (e.g., an airport, military installation, scientific research area, etc.) etc.). Regions and radio resources information may information associated with one or more regions, such as one or more RFs, bands, bandwidths, channels, Tx power information, etc., associated with D2D or V2X communications for a corresponding region. UE 210 (e.g., vehicle 300) may use the regions and radio resources information to perform one or more operations described herein, such as determining the radio resources that should be used for SL communications based on a location of UE 210 (e.g., vehicle 300).

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the example described herein, a user equipment (UE), comprising: a memory; and one or more processors configured to, when executing instructions stored in the memory, cause the UE to: determine a travel route of the UE; monitor a wireless signal while traveling along the travel route; determine locations, separated by equal distances, along the travel route; detect a loss of the wireless signal; estimate a geographic location of the UE based on: a last known location, of the locations along the travel route, of the UE; and a distance traveled since the last known location; determine a region corresponding to an estimated geographic location of the UE; and determine, based on the region, radio resources for use in sidelink (SL) communications.

In example 2, which may also include one or more of the example described herein, wherein the travel route is determined based on a current location of the UE and a destination input by a user.

In example 3, which may also include one or more of the example described herein, wherein the wireless signal comprises as global positioning system (GPS) signal or a global navigation satellite system (GNSS) signal.

In example 4, which may also include one or more of the example described herein, wherein the locations, separated by equal distances, along the travel route are determined in response to determining the travel route.

In example 5, which may also include one or more of the example described herein, wherein the locations, separated by equal distances, along the travel route are determined in response to the UE detecting that a signal strength of the wireless signal has dropped below a signal strength threshold.

In example 6, which may also include one or more of the example described herein, wherein the radio resources comprise physical radio resources and the SL communications comprise direct communications with one or more other UEs via PC5 interface.

In example 7, which may also include one or more of the example described herein, wherein the radio resources are determined in response to the UE crossing a border dividing regions associated with using different radio resources for SL communications.

In example 8, which may also include one or more of the example described herein, wherein the UE refrains from engaging in SL communications while located within a buffer distance of a border.

In example 9, which may also include one or more of the example described herein, wherein the UE refrains from engaging in SL communications while located within a buffer distance of a border.

In example 10, which may also include one or more of the example described herein, a method, performed by a user equipment (UE), the method may comprise: determining a travel route of the UE; monitoring a wireless signal while traveling along the travel route; determine locations, separated by equal distances, along the travel route; detecting a loss of the wireless signal; estimating a geographic location of the UE based on: a last known location, of the locations along the travel route, of the UE; and a distance traveled since the last known location; determining a region corresponding to an estimated geographic location of the UE; and determining, based on the region, radio resources for use in sidelink (SL) communications.

In example 11, which may also include one or more of the example described herein, a non-transitory, computer-readable medium, may comprise: one or more in instructions that when executed by one or more processors, are configured to cause the one or more processors to: a memory; and determine a travel route of the UE; monitor a wireless signal while traveling along the travel route; determine locations, separated by equal distances, along the travel route; detect a loss of the wireless signal; estimate a geographic location of the UE based on: a last known location, of the locations along the travel route, of the UE; and a distance traveled since the last known location; determine a region corresponding to an estimated geographic location of the UE; and determine, based on the region, radio resources for use in sidelink (SL) communications.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. A user equipment (UE), comprising:
a memory; and
one or more processors configured to, when executing instructions stored in the memory, cause the UE to:
  determine a travel route of the UE and locations along the travel route;
  estimate a geographic location of the UE based on:
    a last known location, of the locations along the travel route, of the UE; and
    a distance traveled since the last known location;
  determine a region corresponding to the estimated geographic location of the UE; and
  determine, based on a mapping relation between the region and a radio-resource configuration, a radio resource for use in sidelink (SL) communication.

2. The UE of claim 1, wherein the travel route is determined based on a current location of the UE and a destination input by a user.

3. The UE of claim 1, wherein the geographic location of the UE is estimated when absence of a wireless signal that comprises a global positioning system (GPS) signal or a global navigation satellite system (GNSS) signal.

4. The UE of claim 1, wherein the locations, separated by equal distances, along the travel route are determined in response to determining the travel route.

5. The UE of claim 1, wherein the locations are separated by equal distances and are determined in response to the UE detecting that a signal strength of a wireless signal has dropped below a signal strength threshold.

6. The UE of claim 1, wherein the region is defined from a regulatory partition that assigns the radio-resource configuration to the region.

7. The UE of claim 1, wherein the radio resource is determined in response to the UE crossing a border dividing regions mapped to different radio-resource configurations.

8. The UE of claim 1, wherein the UE refrains from engaging in SL communication while located within a buffer distance of a border.

9. The UE of claim 1, wherein the UE resumes a satellite communication upon re-entering a satellite coverage area of the region.

10. A method, performed by a user equipment (UE), the method comprising:

determining a travel route of the UE;

monitoring a wireless signal for determining a geographic location of the UE, while traveling along the travel route;

determining locations, separated by equal distances, along the travel route;

detecting a loss of the wireless signal;

estimating a geographic location of the UE based on:

a last known location, of the locations along the travel route, of the UE; and a distance traveled since the last known location;

determining a region corresponding to an estimated geographic location of the UE; and determining, based on the region, radio resources for use in sidelink (SL) communications.

11. The method of claim 10, wherein the travel route is determined based on a current location of the UE and a destination input by a user.

12. The method of claim 10, wherein the region is defined from a regulatory partition and is assigned the radio resources.

13. The method of claim 10, wherein the locations are determined in response to determining the travel route.

14. The method of claim 10, wherein the locations are determined in response to the UE detecting that a signal strength of the wireless signal has dropped below a signal strength threshold.

15. The method of claim 10, wherein the SL communications comprise direct communications with one or more other UEs via PC5 interface.

16. The method of claim 10, wherein the radio resources are determined in response to the UE crossing a border dividing regions associated with using different radio resources for SL communications.

17. The method of claim 10, wherein the UE refrains from engaging in SL communications while located within a buffer distance of a border.

18. A non-transitory computer-readable medium, comprising one or more instructions that when executed by one or more processors, are configured to cause the one or more processors to:

determine a travel route of a user equipment (UE);

determine locations, separated by equal distances, along the travel route;

estimate a geographic location of the UE based on:

a last known location, of the locations along the travel route, of the UE; and a distance traveled since the last known location;

determine a region corresponding to the estimated geographic location of the UE; and determine, based on a mapping relation between the region and a radio-resource configuration, a radio resource for use in sidelink (SL) communication.

19. The non-transitory computer-readable medium of claim 18, wherein the region is defined from a regulatory partition that assigns the radio-resource configuration to the region.

20. The non-transitory computer-readable medium of claim 18, wherein the geographic location of the UE is estimated in response to a loss of a wireless signal that comprises a global positioning system (GPS) signal or a global navigation satellite system (GNSS) signal.

* * * * *